(12) United States Patent
Miyake

(10) Patent No.: US 11,743,732 B2
(45) Date of Patent: *Aug. 29, 2023

(54) TERMINAL DEVICE AND NON-TRANSITORY COMPUTER-READABLE RECORDING MEDIUM STORING COMPUTER READABLE INSTRUCTIONS FOR TERMINAL DEVICE

(71) Applicant: BROTHER KOGYO KABUSHIKI KAISHA, Nagoya (JP)

(72) Inventor: Takeshi Miyake, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,899

(22) Filed: Oct. 5, 2021

(65) Prior Publication Data

US 2022/0030434 A1 Jan. 27, 2022

Related U.S. Application Data

(63) Continuation of application No. 17/006,090, filed on Aug. 28, 2020, now Pat. No. 11,159,947.

(30) Foreign Application Priority Data

Aug. 30, 2019 (JP) .................................. 2019-158082

(51) Int. Cl.
*H04W 12/50* (2021.01)
*H04W 12/04* (2021.01)
(Continued)

(52) U.S. Cl.
CPC ............. *H04W 12/50* (2021.01); *H04W 4/50* (2018.02); *H04W 12/04* (2013.01); *H04W 76/10* (2018.02)

(58) Field of Classification Search
CPC ....... H04W 12/50; H04W 4/50; H04W 12/04; H04W 76/10; H04W 4/80; H04W 76/14; H04W 76/18

See application file for complete search history.

(56) References Cited

U.S. PATENT DOCUMENTS 10,976,971 B2   4/2021  Miyake
11,159,947 B2 * 10/2021  Miyake ................. H04W 76/18
(Continued)

FOREIGN PATENT DOCUMENTS

| JP | 2017-028460 A | 2/2017 |
| JP | 2017-175468 A | 9/2017 |
| JP | 2018-42058 A  | 3/2018 |

OTHER PUBLICATIONS

Device Provisioning Protocol Technical Specification Version 1.1, Wi-Fi Alliance, 2018.
(Continued)

*Primary Examiner* — Joseph E Dean, Jr.
(74) *Attorney, Agent, or Firm* — Scully, Scott, Murphy & Presser, PC

(57) ABSTRACT

In a case where a public key of a communication device is obtained, a terminal device may send a first request signal in which the public key is used to the communication device and execute a first-type communication in conformity with the first communication scheme with the communication device. The first-type communication may include sending first connection information for establishing a first wireless connection between the communication device and the access point to the communication device. In a case where the first-type communication has been failed, the terminal device may send a second request signal to the communication device and execute a second-type communication in conformity with the second communication scheme with the communication device. The second-type communication
(Continued)

may include communicating second connection information for establishing a second wireless connection between the terminal device and the communication device with the communication device.

19 Claims, 15 Drawing Sheets

(51) Int. Cl.
*H04W 76/10* (2018.01)
*H04W 4/50* (2018.01)

(56) References Cited

U.S. PATENT DOCUMENTS

| | | |
|---|---|---|
| 2017/0280492 A1 | 9/2017 | Kurihara |
| 2018/0213578 A1 | 7/2018 | Tachibana |
| 2019/0215878 A1 | 7/2019 | Goto |
| 2019/0387392 A1 | 12/2019 | Kurihara |

OTHER PUBLICATIONS

Wi-Fi Peer-to-Peer (P2P) Technical Specification Version 1.1.
Notice of Allowance dated Jun. 23, 2021 from parent application U.S. Appl. No. 17/006,090.
Notice of Reasons for Refusal dated May 9, 2023 received from the Japanese Patent Office in related JP 2019-158082 together with English language translation.

\* cited by examiner (Overview of DPP)

(First Embodiment Case A)

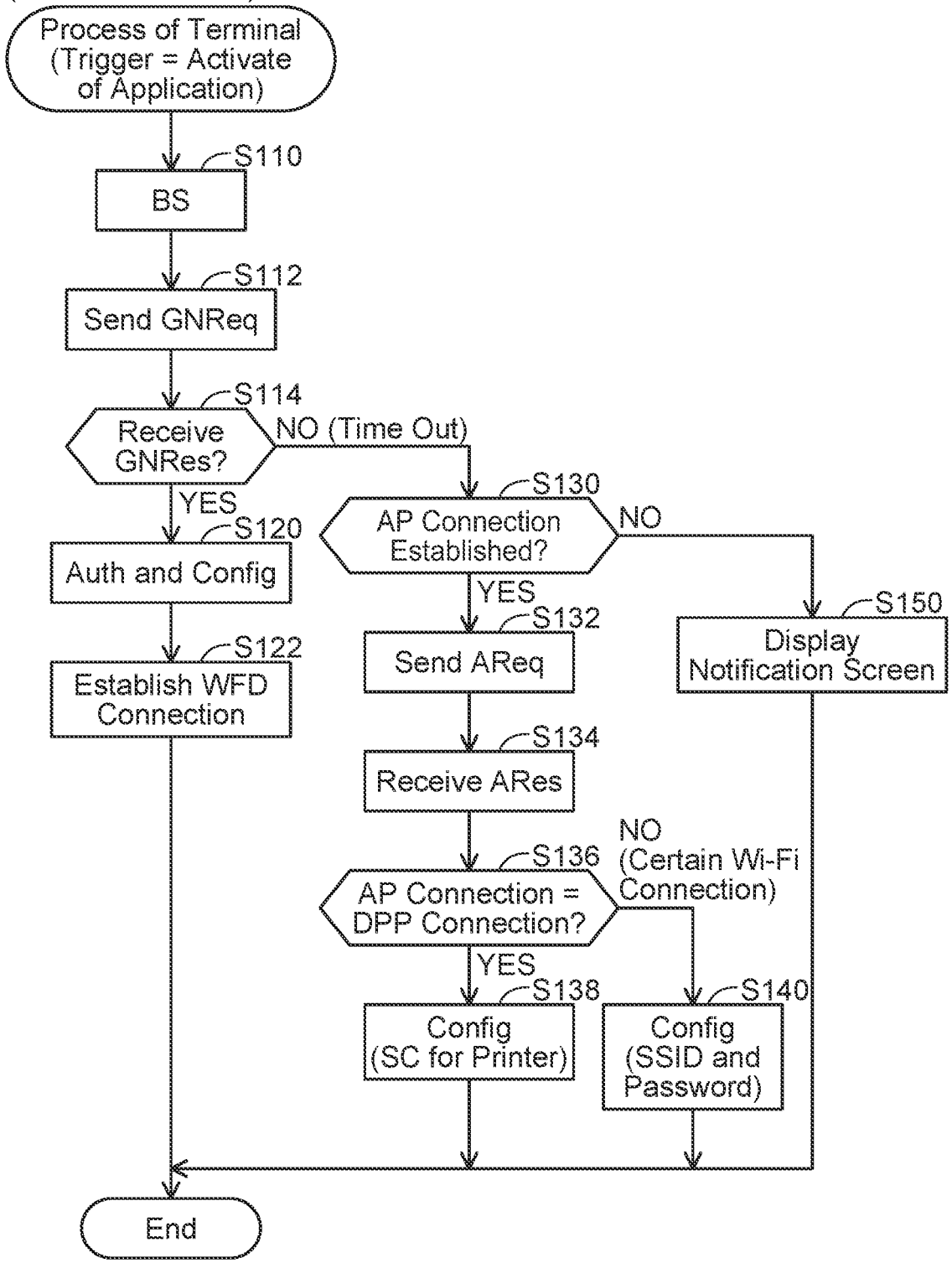

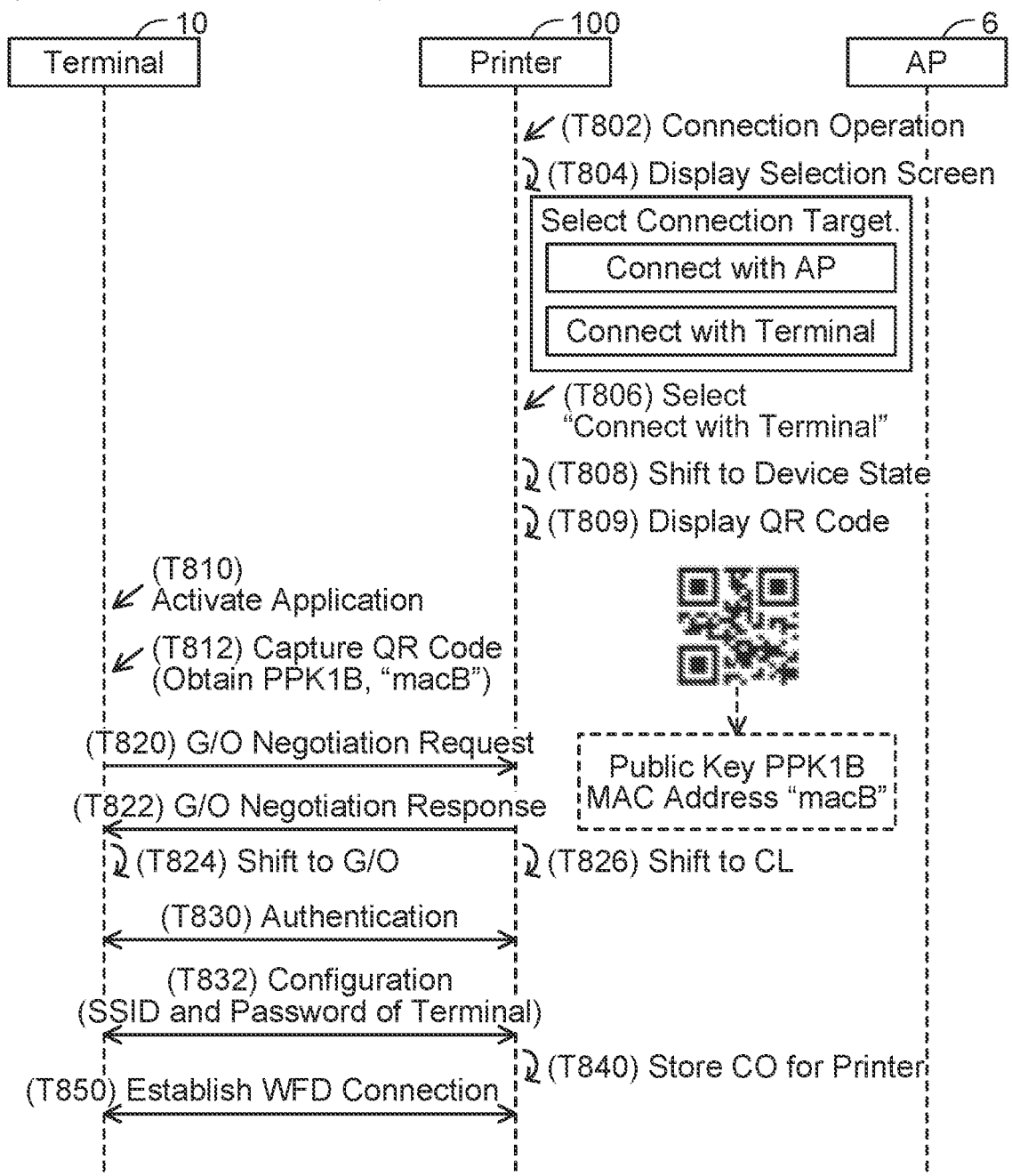

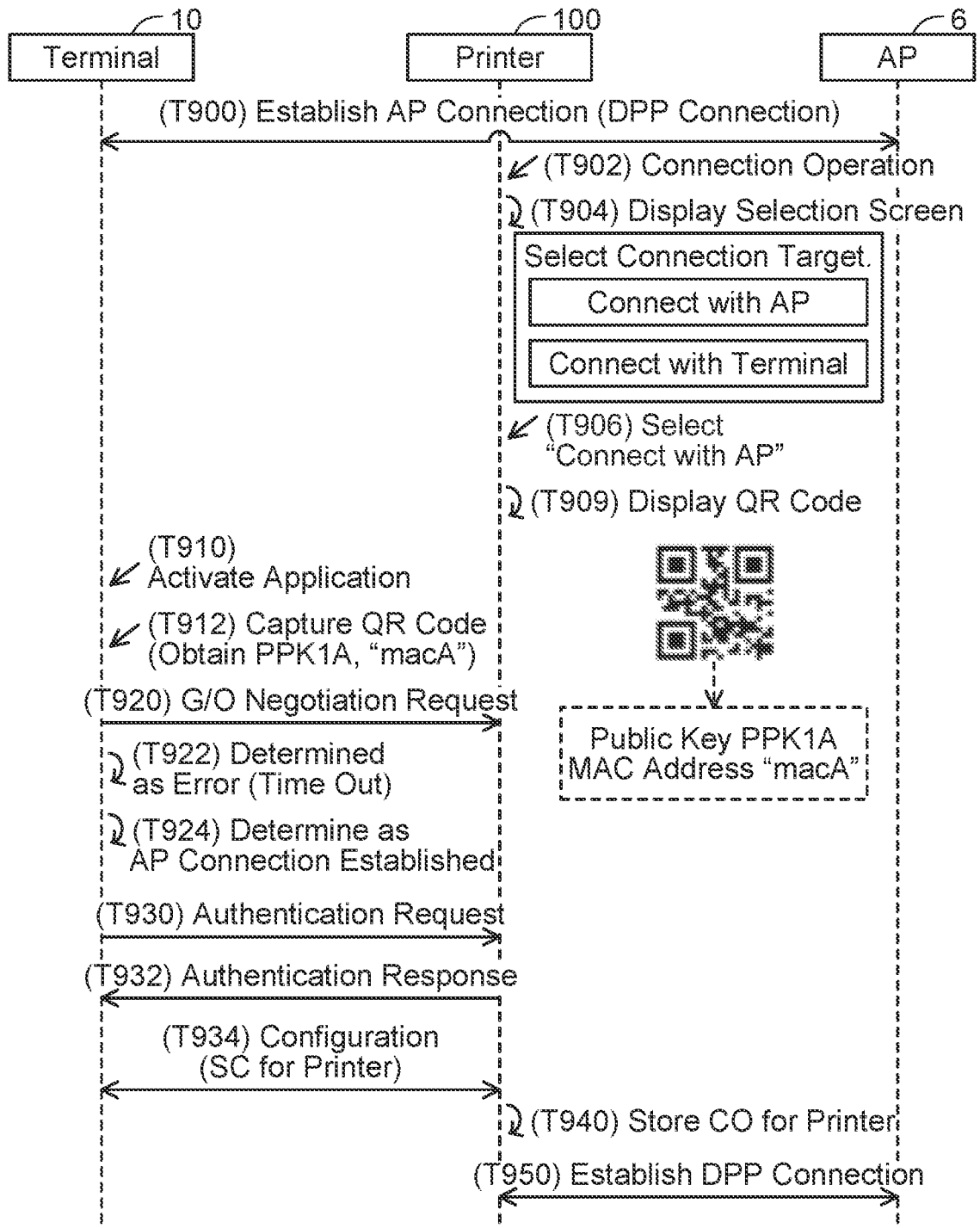

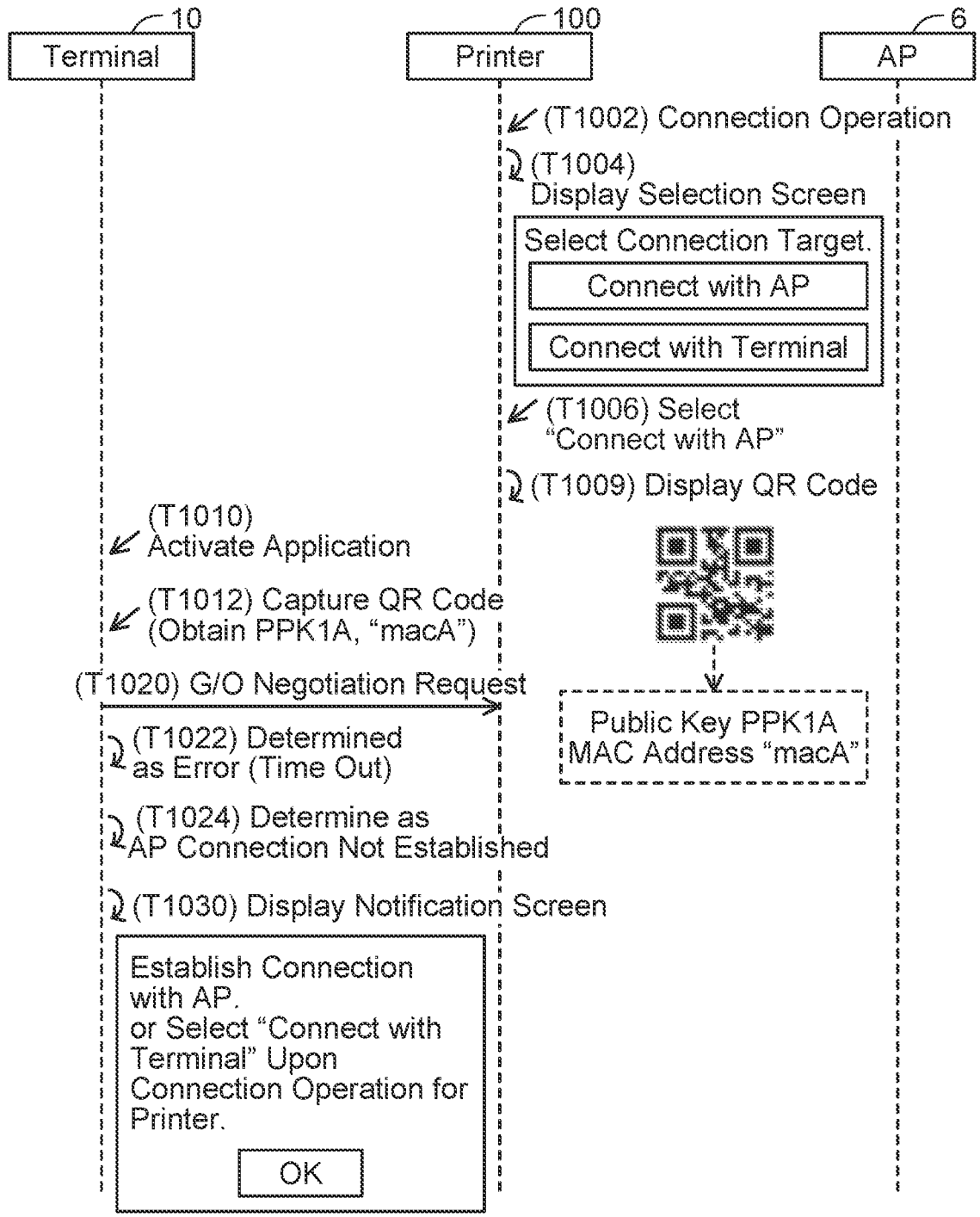

TERMINAL DEVICE AND NON-TRANSITORY COMPUTER-READABLE RECORDING MEDIUM STORING COMPUTER READABLE INSTRUCTIONS FOR TERMINAL DEVICE

CROSS-REFERENCE TO RELATED APPLICATION

This application is a continuation application of U.S. Ser. No. 17/006,090 filed on Aug. 28, 2020 and claims priority to Japanese Patent Application No. 2019-158082, filed on Aug. 30, 2019, the entire contents of each of which are incorporated herein by reference.

TECHNICAL FIELD

The present disclosure discloses a technique that establishes a wireless connection between a communication device and another device by executing an establishment process of a terminal device.

BACKGROUND

A Device Provisioning Protocol (DPP) scheme, which is a wireless communication scheme established by Wi-Fi Alliance, is known. The DPP scheme is a wireless communication scheme for easily establishing a Wi-Fi (Registered Trademark, Wi-Fi Alliance) connection between a pair of devices.

SUMMARY

A terminal device which is capable of executing wireless communication in conformity with a plurality of communication schemes of Wi-Fi standard (e.g., DPP scheme) via a wireless interface may exist. The present disclosure discloses a technique by which such a terminal device may suitably establish a wireless connection of a communication device.

A terminal device disclosed herein may comprise: a wireless interface configured to execute a wireless communication in conformity with either of a first communication scheme of Wi-Fi standard and a second communication scheme of the Wi-Fi standard, the first communication scheme being for executing a wireless communication with a communication device via an access point, and the second communication scheme being for executing a wireless communication with the communication device not via the access point; a controller configured to: obtain a public key of the communication device; send a first request signal in which the public key is used to the communication device via the wireless interface; in response to the first request signal being sent to the communication device, execute a first-type communication in conformity with the first communication scheme with the communication device via the wireless interface, the first-type communication including sending first connection information to the communication device, and the first connection information being for establishing a first wireless connection between the communication device and the access point; determine whether the first-type communication has been failed; and in a case where it is determined that the first-type communication has been failed: send a second request signal different from the first request signal to the communication device via the wireless interface; in response to the second request signal being sent to the communication device, execute a second-type communication in conformity with the second communication scheme with the communication device via the wireless interface, the second-type communication including communicating second connection information with the communication device, and the second connection information being for establishing a second wireless connection between the terminal device and the communication device; and after the second-type communication is executed with the communication device, establish the second wireless connection between the terminal device and the communication device via the wireless interface by using the second connection information.

Another terminal device disclosed herein may comprise: a wireless interface configured to execute a wireless communication in conformity with either of a first communication scheme of Wi-Fi standard and a second communication scheme of the Wi-Fi standard, the first communication scheme being for executing a wireless communication with a communication device via an access point, and the second communication scheme being for executing a wireless communication with the communication device not via the access point; a controller configured to: obtain a public key of the communication device; send a second request signal to the communication device via the wireless interface; in response to the second request signal being sent to the communication device, execute a second-type communication in conformity with the second communication scheme with the communication device via the wireless interface, the second-type communication including communicating second connection information with the communication device, and the second connection information being for establishing a second wireless connection between the terminal device and the communication device; determine whether the second-type communication has been failed; in a case where it is determined that the second-type communication has been succeeded, establish the second wireless connection between the terminal device and the communication device via the wireless interface by using the second connection information; in a case where it is determined that the second-type communication has been failed; send a first request signal being different from the second request signal to the communication device via the wireless interface, the first request signal being a signal in which the public key is used; and in response to the first request signal being sent to the communication device, execute a first-type communication in conformity with the first communication scheme with the communication device via the wireless interface, the first-type communication including sending first connection information to the communication device, and the first connection information being for establishing a first wireless connection between the communication device and the access point.

A method implemented by the terminal device, a computer program for the terminal device and a non-transitory computer-readable medium storing computer-readable instructions for the terminal device are also novel and useful. Moreover, a communication system comprising the above terminal device and another device (e.g. a communication device) is also novel and useful.

BRIEF DESCRIPTION OF DRAWINGS

FIG. 12 shows a flowchart of processes of a terminal of a fifth embodiment;

FIG. 13 shows a sequence diagram of Case C in which an AP connection has not been established between the terminal and the access point;

FIG. 14 shows a sequence diagram of Case D in which an AP connection has been established between the terminal and the access point; and FIG. 15 shows a sequence diagram of Case E in which an AP connection has not been established between the terminal and the access point.

DETAILED DESCRIPTION

First Embodiment

Figure 1:
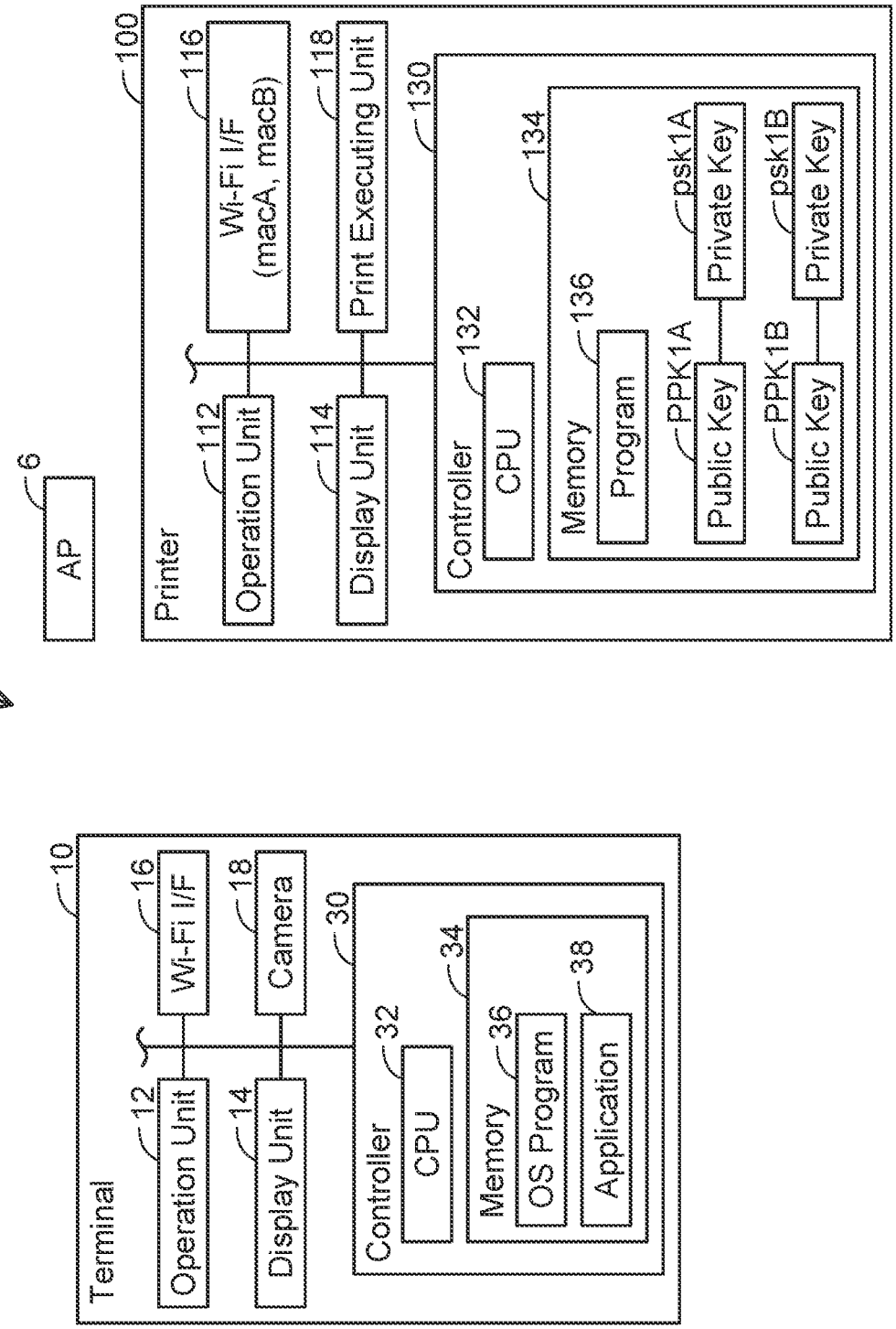
FIG. 1 shows a configuration of a communication system.

Configuration of Communication System 2; FIG. 1

As shown in FIG. 1, a communication system 2 comprises an Access Point (hereinafter abbreviated to "AP") 6, a terminal 10, and a printer 100. In this embodiment, a situation is assumed in which a user uses the terminal 10 to establish a Wi-Fi connection, that is a wireless connection in conformity with Wi-Fi standard, between the printer 100 and another device (e.g. the AP 6 or the terminal 10).

Configuration of Terminal 10

The terminal 10 is a mobile terminal device such as a cellphone (such as a smartphone), a PDA, or a tablet PC. In a variant, the terminal 10 may be a stationary PC, or a laptop PC. The terminal 10 is provided with an operation unit 12, a display unit 14, a Wi-Fi interface 16, a camera 18, and a controller 30. The respective units 12 to 30 are connected to a bus line (for which a reference sign is not given). Hereinafter, an interface will be denoted simply as "I/F".

The operation unit 12 includes a plurality of keys. The operation unit 12 enables the user to input various instructions to the terminal 10 through the operation unit 12. The display unit 14 is a display configured to display various types of information. The display unit 14 may also include a touchscreen function (i.e. operation unit) which receives instructions from the user.

The Wi-Fi I/F 16 is a wireless interface configured to execute Wi-Fi communication in conformity with the Wi-Fi standard. The Wi-Fi standard is a wireless communication standard for executing wireless communication in conformity with 802.11 standard of the Institute of Electrical and Electronics Engineers, Inc (IEEE) and standards complying thereto (such as 802.11a, 11b, 11g, 11n, 11ac, etc.), for example.

The Wi-Fi I/F 16 supports a Device Provisioning Protocol (DPP) scheme that is established by Wi-Fi Alliance. The DPP scheme is described in the standard "Device Provisioning Protocol Technical Specification Version 1.1" created by Wi-Fi Alliance, and is a connection scheme for easily establishing a Wi-Fi connection between a pair of devices by executing an establishment process of the terminal 10. Hereinafter, the established Wi-Fi connection in conformity with the DPP scheme may be termed "DPP connection".

Further, the Wi-Fi I/F 16 supports Wi-Fi Direct (WFD) (Registered Trademark, Wi-Fi Alliance) scheme established by Wi-Fi Alliance. The WFD scheme is a connection scheme described in the standard "Wi-Fi Peer-to-Peer (P2P) Technical Specification Version1.1" created by Wi-Fi Alliance. In the WFD, Group Owner state (called "G/O state" after) and Client state (called "CL state" after) are defined. Further, a state which is different from both the G/O state and the CL state is called "device state" herein. The device which supports the WFD scheme is capable of selectively operating in one of the above three states. Hereinafter, the established Wi-Fi connection in conformity with the WFD scheme may be termed "WFD connection".

Further, the terminal 10 can establish the Wi-Fi connection with the AP 6 in conformity with a certain Wi-Fi scheme which is different from both the DPP scheme and the WFD scheme. Specifically, the terminal 10 can establish the Wi-Fi connection with the AP 6 by using a Service Set Identifier (SSID) of the wireless network formed by the AP 6 and a password in the certain Wi-Fi scheme. Hereinafter, the Wi-Fi connection established in conformity with the certain Wi-Fi scheme may be termed "certain Wi-Fi connection". Further, hereinafter, the DPP connection with the AP 6 and the certain Wi-Fi connection with the AP 6 collectively may be termed "AP connection".

The camera 18 is a device for capturing an image of an object, and in this embodiment, it is used to capture QR Code (Registered Trademark, Denso Wave Incorporated Corporation) for the AP 6 and the printer 100.

The controller 30 includes a CPU 32 and a memory 34. The CPU 32 is configured to execute various processes according to programs 36 and 38 stored in the memory 34. The memory 34 may be a volatile memory, a nonvolatile memory and the like and stores the OS program 36 and application 38 (hereinafter termed simply as "app 38").

The OS program 36 is a program for controlling basic operation of the terminal 10. The app 38 is a program for establishing the Wi-Fi connection between the printer 100 and the other device (e.g. the AP 6 or the terminal 10) by executing an establishment process of the terminal 10. The app 38 may be installed to the terminal 10, for example, from a server on the Internet provided by a vendor of the printer 100

Configuration of Printer 100

The printer 100 is a peripheral device (e.g., a peripheral device working with the terminal 10) capable of executing a print function. The printer 100 is provided with an operation unit 112, a display unit 114, a Wi-Fi I/F 116, a print executing unit 118, and a controller 130. The respective units 112 to 130 are connected to a bus line (for which a reference sign is not given).

The operation unit 112 includes a plurality of keys. The operation unit 112 enables the user to input various instructions to the printer 100 through the operation unit 112. The display unit 114 is a display configured to display various types of information. The print executing unit 118 includes a printing engine such as an inkjet technology or a laser technology.

The Wi-Fi I/F 116 is physically one I/F. The Wi-Fi I/F 116 supports both the DPP scheme and the WFD scheme. Accordingly, the printer 100 can establish the DPP connection with the AP 6 and can establish the WFD connection with the terminal 10. Further, the printer 100 can establish the certain Wi-Fi connection with the AP 6. The Wi-Fi I/F 116 is assigned with a MAC address "macA" being for establishing the AP connection and is assigned with a MAC address "macB" being for establishing the WFD connection. The MAC address "macA" and the MAC address "macB" are different from each other.

The controller 130 includes a CPU 132 and a memory 134. The CPU 132 is configured to execute various processes according to a program 136 stored in the memory 134. The memory 134 may be a volatile memory, a non-volatile memory and the like. The memory 134 stores a public key PPK1A and a public key PPK1B different from the public key PPK1A in advance before shipping of the printer 100. Further, the memory 134 stores a private key psk1A corresponding to the public key PPK1A and a private key psk1B corresponding to the public key PPK1B in advance. The public key PPK1A and the private key psk1A are used in a situation where the printer 100 should establish the AP connection. Further, the public key PPK1B and the private key psk1B are used in a situation where the printer 100 should establish the WFD connection with the terminal 10.

Figure 2:
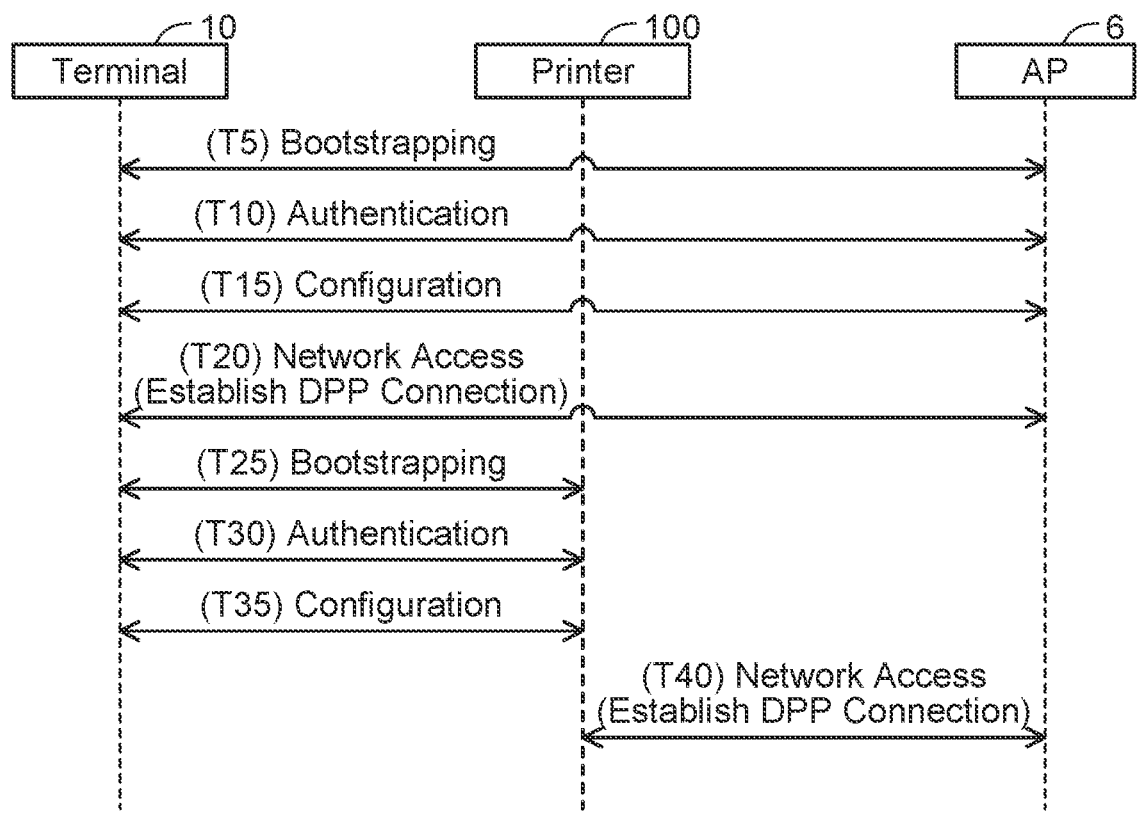
FIG. 2 shows a schematic sequence diagram of an overview of a process for establishing a wireless connection between a printer and an access point.

Overview of the DPP; FIG. 2

Next, an overview of the DPP will be described with reference to FIG. 2. The AP 6 also supports the DPP scheme. In this embodiment, the DPP connection between the printer 100 and the AP 6 is established by each of the devices 6, 10, 100 executing communication in conformity with the DPP scheme. Hereinafter, to facilitate understanding, operations which CPUs (such as the CPUs 32, 132) of the respective devices execute will be described with the devices (such as the terminal 10, the printer 100) as subjects of action instead of describing the operations with the CPUs as the subjects of action.

In T5, the terminal 10 executes Bootstrapping (hereinafter abbreviated to "BS") in conformity with the DPP scheme with the AP 6. The BS is a process of providing information that is to be used in Authentication (hereinafter abbreviated to "Auth") of T10 (to be described later) from the AP 6 to the terminal 10 in response to a QR Code adhered to the AP 6 being captured by the terminal 10.

In T10, the terminal 10 executes Auth in conformity with the DPP scheme with the AP 6 by using the information obtained in the BS of T5. The Auth is a process for the terminal 10 and the AP 6 to authenticate each other.

In T15, the terminal 10 executes Configuration (hereinafter abbreviated to "Config") in conformity with the DPP scheme with the AP 6. The Config is a process of sending information to the AP 6 for the AP 6 to establish the DPP connection. Specifically, in the Config, the terminal 10 generates a Configuration Object (hereinafter, Configuration Object is abbreviated to "CO") for AP, and sends the CO for AP to the AP 6. As a result, the CO for AP is stored in the AP 6.

In T20, the terminal 10 executes Network Access (hereinafter abbreviated to "NA") in conformity with the DPP scheme with the AP 6. The terminal 10 generates a CO for terminal and stores the CO for terminal in the memory 34 in the NA. The terminal 10 and the AP 6 share a connection key for establishing the DPP connection between the terminal 10 and the AP 6 by using the CO for terminal and the CO for AP. Then, the terminal 10 and the AP 6 execute 4-way handshake communication. In at least a part of the 4-way handshake communication, the terminal 10 and the AP 6 communicate encrypted information encrypted by the shared connection key. Further, in a case where decryption of the encrypted information succeeds, the DPP connection is established between the terminal 10 and the AP 6. Accordingly, the terminal 10 can participate, as a child station, in a wireless network formed by the AP 6. In a variant, the terminal 10 and the AP 6 may execute Simultaneous Authentication of Equals (SAE, also called "Dragonfly") communication, instead of the 4-way handshake communication.

Next, the terminal 10 executes BS in conformity with the DPP scheme with the printer 100 in T25. The BS is a process of providing information that is to be used in Auth of T30 (to be described later) from the printer 100 to the terminal 10 in response to a QR Code displayed in the printer 100 being captured by the terminal 10.

In T30, the terminal 10 executes Auth in conformity with the DPP scheme with the printer 100 by using the information obtained in the BS of T25. The Auth is a process for the terminal 10 and the printer 100 to authenticate each other.

In T35, the terminal 10 executes Config in conformity with the DPP scheme with the printer 100. This Config is a process of sending information for establishing the DPP connection between the printer 100 and the AP 6 to the printer 100. In this Config, the terminal 10 generates a CO for printer for establishing the DPP connection between the printer 100 and the AP 6, and sends the CO for printer to the printer 100. As a result, the CO for printer is stored in the printer 100.

In T40, the printer 100 and the AP 6 execute the NA in conformity with the DPP scheme by using the stored CO for AP and CO for printer and share a connection key. Then, the printer 100 and the AP 6 execute 4-way handshake communication and communicate encrypted information encrypted by the shared connection key. As a result, the DPP connection is established between the printer 100 and the AP 6. Accordingly, the printer 100 can participate, as a child station, in a wireless network formed by the AP 6. That is, the terminal 10 and the printer 100 both belong in the same wireless network formed the AP 6. Accordingly, the terminal 10 and the printer 100 can communicate data, for example representing a print target image, via the AP 6.

In the DPP scheme, in order to establish the Wi-Fi connection (i.e. the DPP connection) between the terminal 10 and the AP 6 or between the printer 100 and the AP 6, the user does not need to input information of the wireless network in which the AP 6 operates as a parent station (such as a Service Set Identifier (SSID) and a password) to the terminal 10 or the printer 100. As such, the user can easily establish the Wi-Fi connection between the terminal 10 and the AP 6 or between the printer 100 and the AP 6.

Description on Respective Processes; FIGS. 3 to 6

Next, details of the respective processes executed in T25 to T40 of FIG. 2 will be described with reference to FIGS.

3 to 6. Since the processes of T5 to T15 are similar to the processes of T25 to T35 except that the AP 6 is used instead of the printer 100, the detailed description thereof will be omitted. Further, since the process of T20 is similar to the process of T40 except that the process of T20 is a process between the terminal 10 and the AP 6, the detailed description thereof will be omitted.

Figure 3:
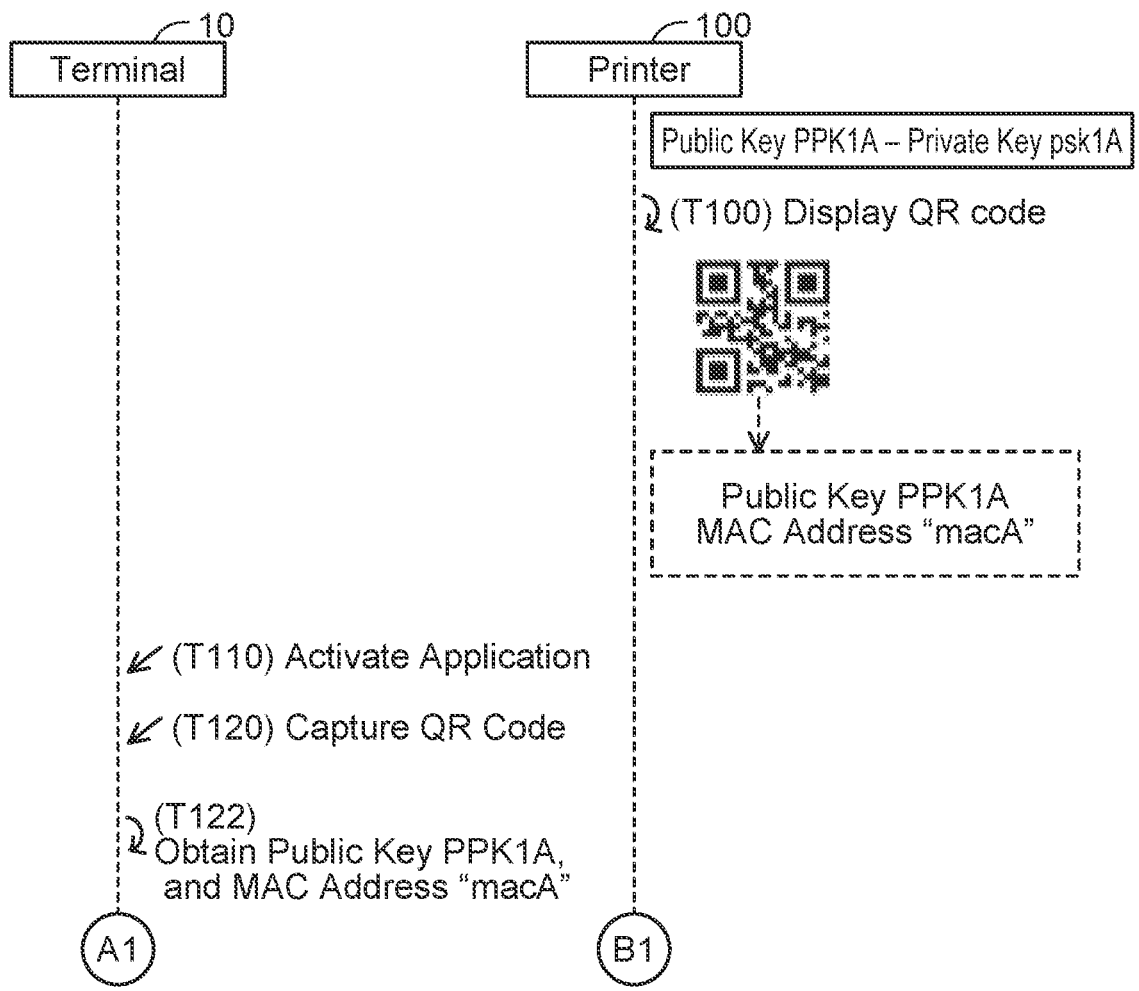
FIG. 3 shows a sequence diagram of a Bootstrapping process.

Bootstrapping (BS); FIG. 3

Firstly, the process of the BS executed between the terminal 10 and the printer 100 in T25 of FIG. 2 will be described with reference to FIG. 3.

In response to accepting an operation by the user, the printer 100 causes the display unit 114 to display a QR Code in T100. In this case, the QR Code is obtained by coding the public key PPK1A of the printer 100 and the MAC address "macA" of the Wi-Fi I/F 116 of the printer 100. That is, this QR Code is for the printer 100 establishing the AP connection. In a variant, the above QR Code may be adhered to a housing of the printer 100 or may be attached to a manual etc. of the printer 100.

In T110, the user activates the app 38 installed to the terminal 10. In T120, the terminal 10 activates the camera 18 in response to the app 38 being activated, and captures the QR Code displayed on the printer 100 by using the camera 18. Further, in T122, the terminal 10 decodes the captured QR Code and obtains the public key PPK1A and the MAC address "macA". When the process of T122 is completed, the process of FIG. 3 is terminated.

Figure 4:
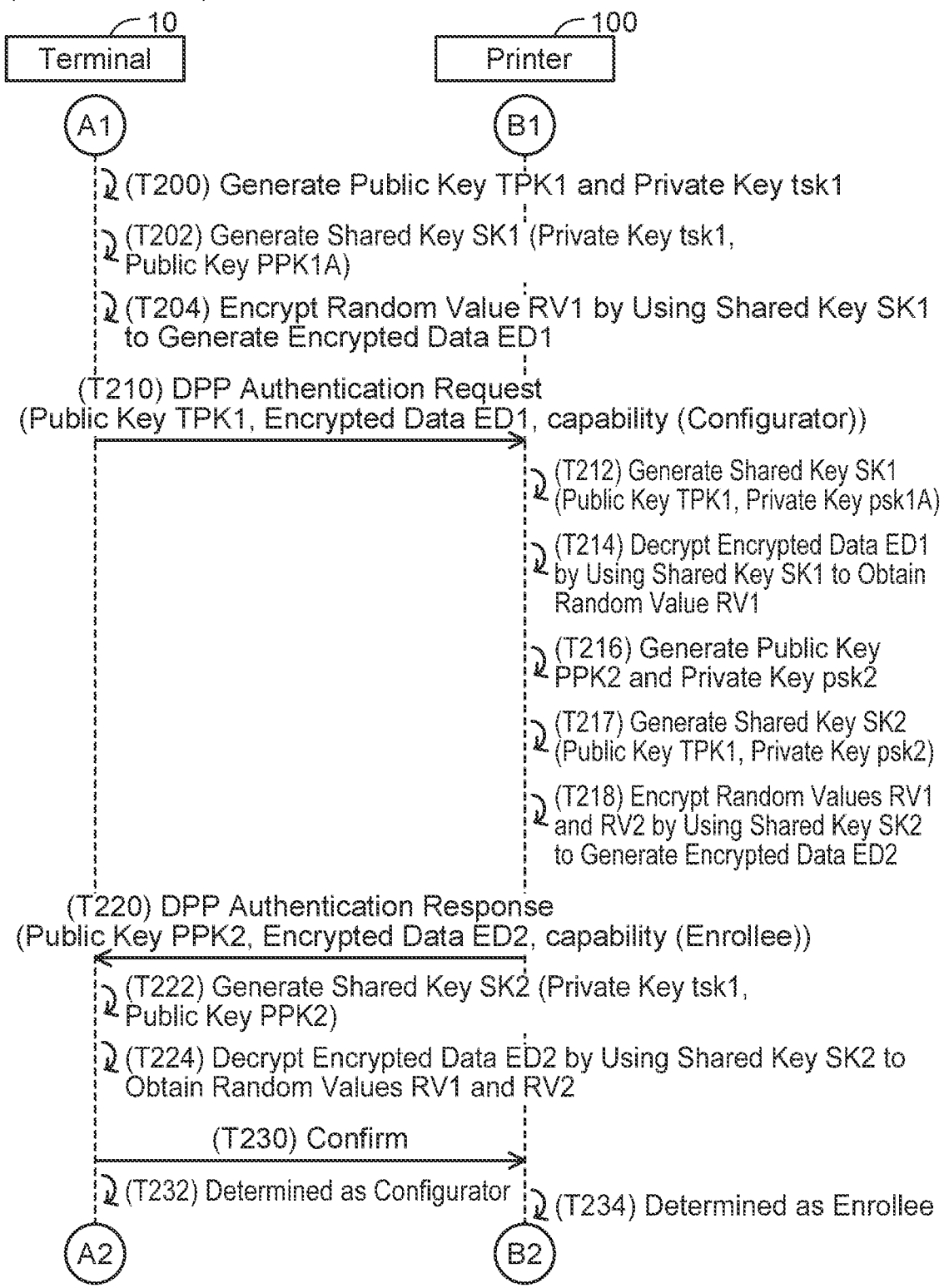
FIG. 4 shows a sequence diagram of an Authentication process.

Authentication (Auth); FIG. 4

Next, the process of the Auth executed between the terminal 10 and the printer 100 in T30 of FIG. 2 will be described with reference to FIG. 4.

In T200, the terminal 10 generates a public key TPK1 and a private key tsk1 of the terminal 10. Next, in T202, the terminal 10 generates a shared key SK1 in conformity with Elliptic curve Diffie-Hellman key exchange (ECDH) by using the generated private key tsk1 and the public key PPK1A of the printer 100 obtained in T122 of FIG. 3. Then, in T204, the terminal 10 generates encrypted data ED1 by using the generated shared key SK1 to encrypt a random value RV1.

In T210, the terminal 10 sends a DPP Authentication Request (hereinafter abbreviated to "AReq") via the Wi-Fi I/F 16 to the printer 100 by setting the MAC address "macA" obtained in T122 of FIG. 3 as its destination. The AReq is a signal for requesting the printer 100 to execute authentication. The AReq includes the public key TPK1 of the terminal 10 generated in T200, the encrypted data ED1 generated in T204, and a capability of the terminal 10.

The capability is information that is pre-designated in a device supporting the DPP scheme, and includes any one of the following values: a value indicating that this device is capable of operating only as a Configurator in conformity with the DPP scheme, a value indicating that this device is capable of operating only as an Enrollee in conformity with the DPP scheme, and a value indicating that this device is capable of operating whichever one of the Configurator and the Enrollee. The Configurator refers to a device configured to send a CO used in the NA (T40 of FIG. 2) to an Enrollee in the Config (T35 of FIG. 2). On the other hand, the Enrollee refers to a device that receives the CO used in the NA from the Configurator in the Config. As above, in this embodiment, the terminal 10 generates the CO for AP and the CO for printer and sends them respectively to the AP 6 and the printer 100. As such, the capability of the terminal 10 includes the value indicating that the terminal 10 is capable of operating only as the Configurator.

The printer 100 receives the AReq from the terminal 10 via the Wi-Fi I/F 116 in T210. As above, this AReq is sent with the MAC address "macA" of the printer 100 as the destination. As such, the printer 100 can suitably receive this AReq from the terminal 10.

Next, the printer 100 executes following processes for authenticating the sender of the AReq (that is, the terminal 10). Specifically, firstly, in T212, the printer 100 generates a shared key SK1 in conformity with the ECDH by using the public key TPK1 of the terminal 10 in the AReq and the private key psk1A of the printer 100. Here, the shared key SK1 generated by the terminal 10 in T202 and the shared key SK1 generated by the printer 100 in T212 are identical to each other. Thus, the printer 100 can suitably decrypt the encrypted data ED1 in the AReq by using the generated shared key SK1 in T214, as a result of which the printer 100 can obtain the random value RV1. In a case where the decryption of the encrypted data ED1 succeeds, the printer 100 determines that the sender of the AReq is the device that captured the QR Code displayed on the printer 100, that is, determines that the authentication succeeded, and executes subsequent processes from T216. On the other hand, in a case where the decryption of the encrypted data ED1 does not succeed, the printer 100 determines that the sender of the AReq is not the device that captured the QR Code displayed on the printer 100, that is, determines that the authentication failed, and does not execute the subsequent processes from T216.

In T216, the printer 100 generates a new public key PPK2 and a new private key psk2 of the printer 100. In a variant, the public key PPK2 and the private key psk2 may be stored in advance in the printer 100. Next, in T217, the printer 100 generates a shared key SK2 in conformity with the ECDH by using the public key TPK1 of the terminal 10 in the AReq of T210 and the generated private key psk2 of the printer 100. Then, in T218, the printer 100 generates encrypted data ED2 by using the generated shared key SK2 to encrypt the obtained random value RV1 and a new random value RV2.

In T220, the printer 100 sends a DPP Authentication Response (hereinafter abbreviated to "ARes") to the terminal 10 via the Wi-Fi I/F 116. This ARes includes the public key PPK2 of the printer 100 generated in T216, the encrypted data ED2 generated in T218, and a capability of the printer 100. This capability includes the value indicating that the printer 100 is capable of operating only as the Enrollee.

In response to receiving the ARes from the printer 100 via the Wi-Fi I/F 16 in T220, the terminal 10 executes following processes for authenticating the sender of the ARes (that is, the printer 100). Specifically, firstly in T222, the terminal 10 generates a shared key SK2 in conformity with the ECDH by using the private key tsk1 of the terminal 10 generated in T200 and the public key PPK2 of the printer 100 in the ARes. Here, the shared key SK2 generated by the printer 100 in T217 and the shared key SK2 generated by the terminal 10 in T222 are identical to each other. Thus, the terminal 10 can suitably decrypt the encrypted data ED2 in the ARes by using the generated shared key SK2 in T224, as a result of which the terminal 10 can obtain the random values RV1 and RV2. In a case where the decryption of the encrypted data ED2 succeeds, the terminal 10 determines that the sender of the ARes is the device that displayed the captured QR Code, that is, determines that the authentication succeeded, and executes subsequent processes from T230. On the other hand, in a case where the decryption of the encrypted data ED2 does not succeed, the terminal 10 determines that the sender of the ARes is not the device that displayed the captured QR Code, that is, determines that the authentication failed, and does not execute the subsequent processes from T230.

In T230, the terminal 10 sends a Confirm to the printer 100 via the Wi-Fi I/F 16. The Confirm includes information indicating that the terminal 10 operates as the Configurator and the printer 100 operates as the Enrollee. As a result, the terminal 10 determines to operate as the Configurator in T232, and the printer 100 determines to operate as the Enrollee in T234. When the process of T234 is completed, the process of FIG. 4 is terminated.

Figure 5:
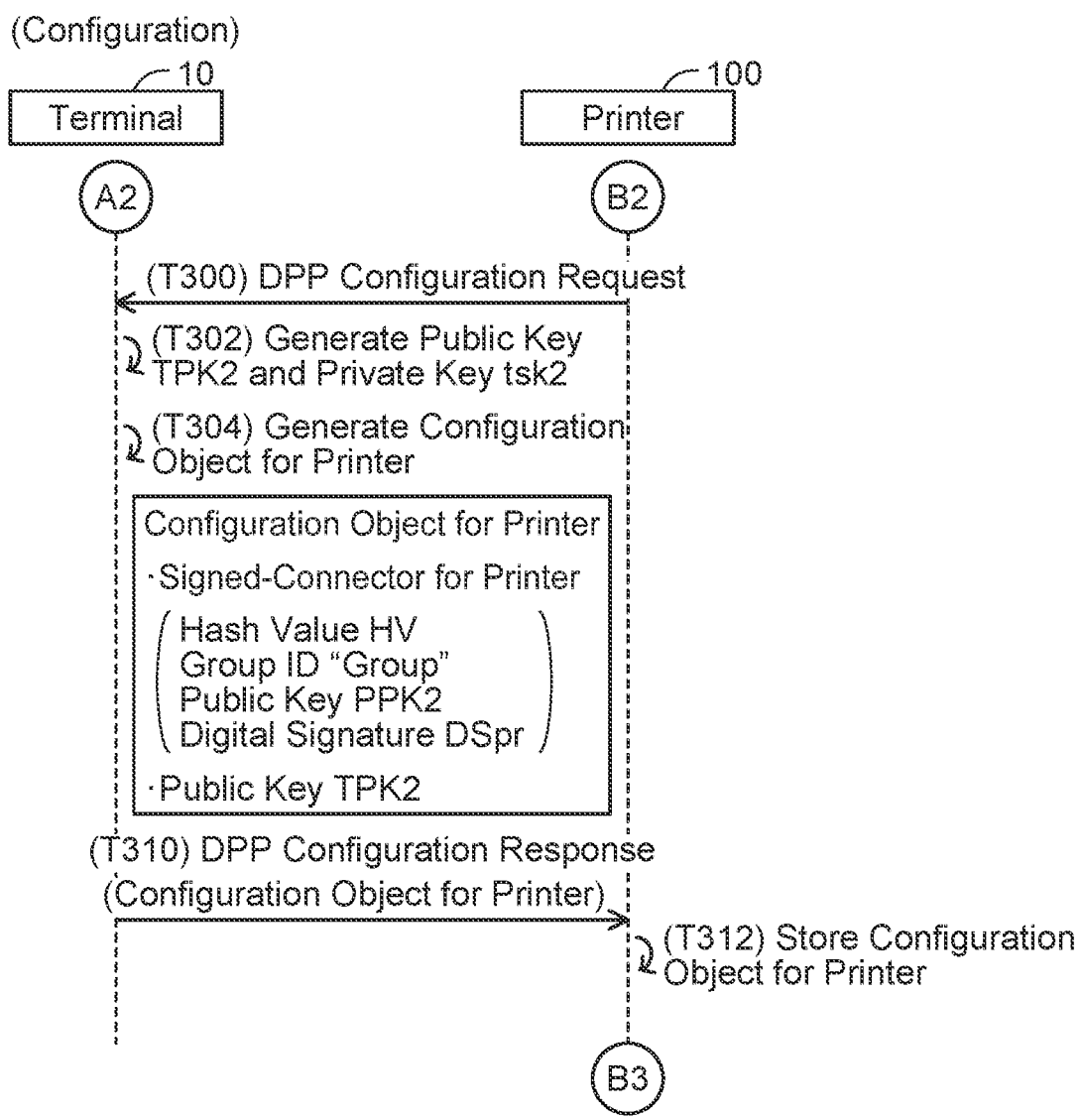
FIG. 5 shows a sequence diagram of a Configuration process.

Configuration (Config); FIG. 5

Next, the process of the Config executed between the terminal 10 and the printer 100 in T35 of FIG. 2 will be described with reference to FIG. 5.

In T300, the printer 100 sends a DPP Configuration Request (hereinafter abbreviated to "CReq") to the terminal 10 via the Wi-Fi I/F 116. This CReq is a signal requesting the CO for printer to be sent.

The terminal 10 receives the CReq from the printer 100 in T300 via the Wi-Fi I/F 16. In this case, the terminal 10 generates a new public key TPK2 and a new private key tsk2 of the terminal 10 in T302. Next, in T304, the terminal 10 generates the CO for printer by using the generated private key tsk2. Specifically, the terminal 10 executes following processes.

Firstly, the terminal 10 generates a hash value HV by hashing the public key TPK2 of the terminal 10. Further, the terminal 10 generates a specific value by hashing a combination of the hash value HV, the group ID "Group", and the public key PPK2 of the printer 100 in the ARes of T220 of FIG. 4. Then, the terminal 10 generates a digital signature DSpr by using the private key tsk2 of the terminal 10 to encrypt the generated specific value in conformity with an Elliptic Curve Digital Signature Algorithm (ECDSA). As a result, the terminal 10 can generate a Signed-Connector for printer (hereinafter, the Signed-Connector is abbreviated to "SC") including the hash value HV, the group ID "Group", the public key PPK2 of the printer 100, and the digital signature DSpr. Further, the terminal 10 generates the CO for printer including the SC for printer and the public key TPK2 of the terminal 10.

In T310, the terminal 10 sends a DPP Configuration Response (hereinafter abbreviated to "CRes") including the CO for printer to the printer 100 via the Wi-Fi I/F 16.

The printer 100 receives the CRes from the terminal 10 in T310 via the Wi-Fi I/F 116. In this case, the printer 100 stores the CO for printer in the CRes in T312. The CO for printer is information that is to be used in the DPP connection with the AP 6 and can be called connection information for establishing the DPP connection with AP 6. When the process of T312 is completed, the process of FIG. 5 is terminated.

Figure 6:
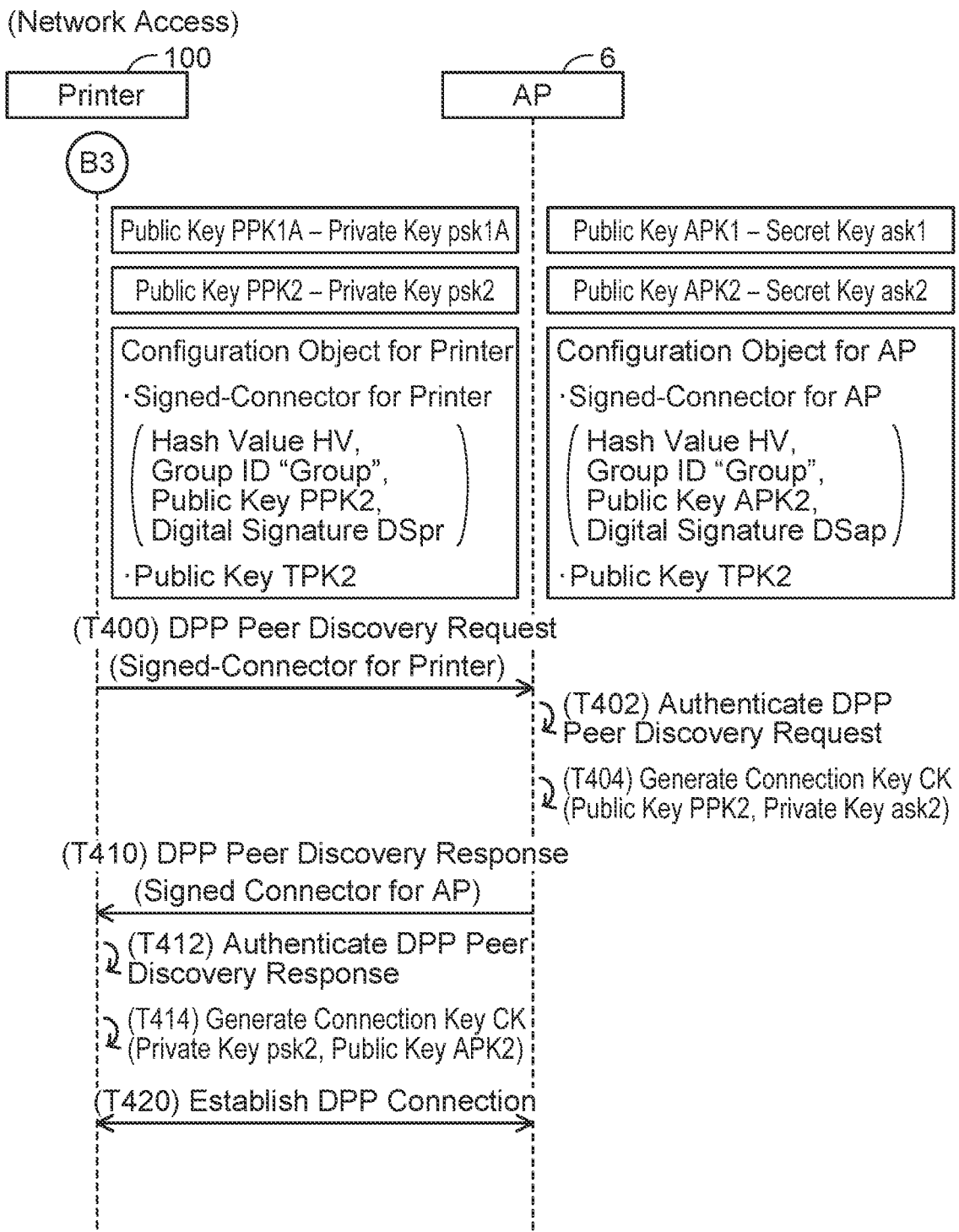
FIG. 6 shows a sequence diagram of a Network Access process.

Network Access (NA); FIG. 6

Next, the process of the NA in T40 of FIG. 2 executed between the printer 100 and the AP 6 will be described with reference to FIG. 6. As aforementioned, the processes of T5 to T15 of FIG. 2 have already been executed between the terminal 10 and the AP 6, similarly to T25 to T35 of FIG. 2.

The AP 6 stores in advance a public key APK1 and a private key ask1 of the AP 6. Further, a QR Code, which is obtained by coding the public key APK1 of the AP 6 and a MAC address of the AP 6, is adhered to a housing of the AP 6. Processes similar to the processes from T200 of FIG. 4 are executed between the terminal 10 and the AP 6 when the terminal 10 captures this QR Code. As a result, the AP 6 stores a public key APK2 and a private key ask2 of the AP 6 (see T216 of FIG. 4), and further stores the CO for AP received from the terminal 10 (see T312 of FIG. 5). The CO for AP includes a SC for AP and a public key TPK2 of the terminal 10. This public key TPK2 is identical to the public key TPK2 included in the CO for printer. Further, the SC for AP includes a hash value HV, a group ID "Group", the public key APK2 of the AP 6, and a digital signature DSap. This hash value HV and this group ID "Group" are respectively identical to the hash value HV and the group ID "Group" included in the CO for printer. The digital signature DSap is information in which a specific value, which is obtained by hashing a combination of the hash value HV, the group ID "Group", and the public key APK2, is encrypted by the private key tsk2 of the terminal 10, and is a value different from the digital signature DSpr included in the CO for printer.

In T400, the printer 100 sends a DPP Peer Discovery Request (hereinafter abbreviated to "DReq") including the SC for printer to the AP 6 via the Wi-Fi I/F 116. This DReq is a signal requesting the AP 6 to execute authentication and send the SC for AP.

In response to receiving the DReq from the printer 100 in T400, the AP 6 executes a process for authenticating the sender of the DReq (that is, the printer 100) and the respective kinds of information in the DReq (that is, the hash value HV, the "Group", and the public key PPK2). Specifically, in T402, the AP 6 firstly executes a first AP determination process that is regarding whether or not the hash value HV and the group ID "Group" in the received SC for printer are respectively identical to the hash value HV and the group ID "Group" in the SC for AP included in the stored CO for AP. In the case of FIG. 6, the AP 6 determines "identical" in the first AP determination process, thus it determines that the authentication of the sender of the DReq (that is, the printer 100) succeeds. Here, the fact that the hash value HV in the received SC for printer is identical to the hash value HV in the SC for AP included in the stored CO for AP means that the SC for printer and the SC for AP were generated by the same device (that is, the terminal 10). As such, the AP 6 also determines that authentication of the generator of the received SC for printer (that is, the terminal 10) succeeds. Further, the AP 6 decrypts the digital signature DSpr in the received SC for printer by using the public key TPK2 of the terminal 10 included in the stored CO for AP. Since the decryption of the digital signature DSpr succeeds in the case of FIG. 6, the AP 6 executes a second AP determination process that is regarding whether or not a specific value obtained by decrypting the digital signature DSpr is identical to a value obtained by hashing the respective kinds of information in the received SC for printer (that is, the hash value HV, the "Group", and the public key PPK2). In the case of FIG. 6, the AP 6 determines "identical" in the second AP determination process, thus it determines that the authentication of the respective kinds of information in the DReq succeeds, and executes processes from T404. The fact that the AP 6 determines "identical" in the second AP determination process means that the respective kinds of information in the received SC for printer (that is, the hash value HV, the "Group", and the public key PPK2) has not been tampered with by a third party since the CO for printer was stored in the printer 100. On the other hand, in a case where the AP 6 determines "not identical" in the first AP determination process, in a case where the decryption of the digital signature DSpr fails, or in a case where the AP 6 determines "not identical" in the second AP determination process, the AP 6 determines that the authentication fails and does not execute the processes from T404.

Next, in T404, the AP 6 generates a connection key CK (that is, a shared key) by using the obtained public key PPK2 of the printer 100 and the stored private key ask2 of the AP 6 in conformity with the ECDH.

In T410, the AP 6 sends a DPP Peer Discovery Response (hereinafter abbreviated to "DRes") including the SC for AP to the printer 100.

In response to receiving the DRes from the AP 6 in T410 via the Wi-Fi I/F 116, the printer 100 executes a process for authenticating the sender of the DRes (that is, the AP 6) and the respective kinds of information in the DRes (that is, the hash value HV, the "Group", and the public key APK2). Specifically, in T412, the printer 100 firstly executes a first PR determination process that is regarding whether or not the hash value HV and the group ID "Group" in the received SC for AP are respectively identical to the hash value HV and the group ID "Group" in the SC for printer included in the stored CO for printer. In the case of FIG. 6, the printer 100 determines "identical" in the first PR determination process, thus it determines that the authentication of the sender of the DRes (that is, the AP 6) succeeded. The fact that the hash value HV in the received SC for AP is identical to the hash value HV in the SC for printer included in the stored CO for printer means that the SC for printer and the SC for AP were generated by the same device (that is, the terminal 10). As such, the printer 100 also determines that authentication of the generator of the received SC for AP (that is, the terminal 10) succeeds. Further, the printer 100 decrypts the digital signature DSap in the received SC for AP by using the public key TPK2 of the terminal 10 included in the stored CO for printer. Since the decryption of the digital signature DSap succeeds in the case of FIG. 6, the printer 100 executes a second PR determination process that is regarding whether or not a specific value obtained by decrypting the digital signature DSap is identical to a value obtained by hashing the respective kinds of information in the received SC for AP (that is, the hash value HV, the "Group", and the public key APK2). In the case of FIG. 6, the printer 100 determines "identical" in the second PR determination process, thus it determines that the authentication of the respective kinds of information in the DRes succeeds, and executes processes from T414. The fact that the printer 100 determines "identical" in the second PR determination process means that the respective kinds of information in the received SC for AP (that is, the hash value HV, the "Group", and the public key APK2) has not been tampered with by a third party since the CO for AP was stored in the AP 6. On the other hand, in a case where the printer 100 determines "not identical" in the first PR determination process, in a case where the decryption of the digital signature DSap fails, or in a case where the printer 100 determines "not identical" in the second PR determination process, the printer 100 determines that the authentication failed and does not execute the processes from T414.

In T414, the printer 100 generates a connection key CK by using the stored private key psk2 of the printer 100 and the public key APK2 of the AP 6 in the received SC for AP in conformity with the ECDH. Here, the connection key CK generated by the AP 6 in T404 and the connection key CK generated by the printer 100 in T414 are identical to each other. Accordingly, the connection key CK for establishing the DPP connection is shared between the printer 100 and the AP 6.

As aforementioned, after the connection key CK is shared between the printer 100 and the AP 6, the printer 100 and the AP 6 execute the 4 way-handshake communication by using the connection key CK in T420. As a result, the DPP connection is established between the printer 100 and the AP 6. When T420 is completed, the process of FIG. 6 is terminated.

Figure 7:
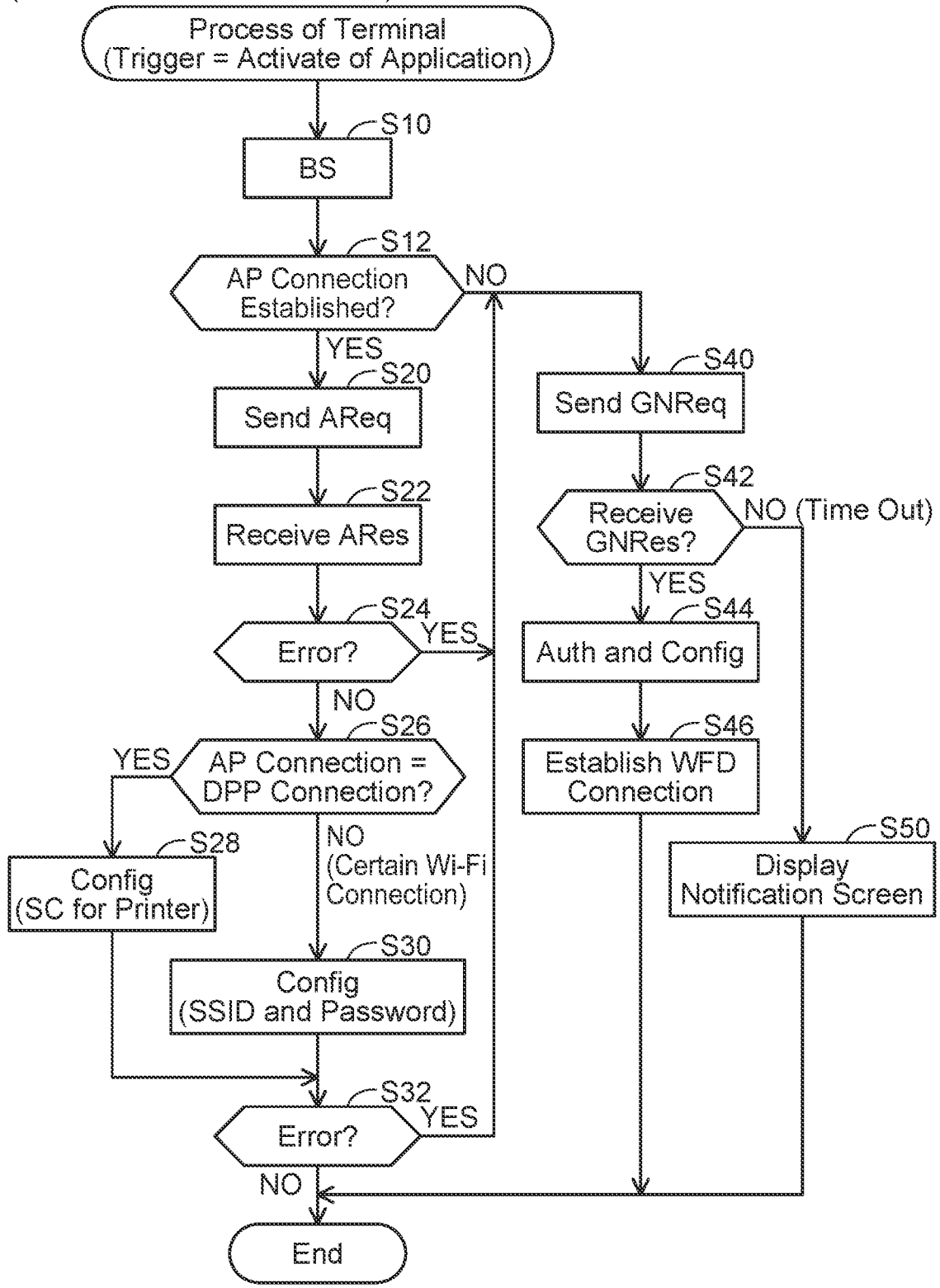
FIG. 7 shows a flowchart of processes of a terminal of first to fourth embodiments.

Process of Terminal; FIG. 7

Process executed by the CPU 32 of the terminal 10 will be described with reference to FIG. 7. The CPU 32 initiates the process of FIG. 7 in a case where the app 38 is activated by the user.

In S10, the CPU 32 executes the BS with the printer 100. When the user operates the printer 100, a QR Code is displayed (see T100 of FIG. 3). Here, in this embodiment, different QR Codes are displayed according to an operation by the user. Specifically, one of the QR Code obtained by coding the public key PPK1A and the MAC address "macA" or a QR Code obtained by coding the public key PPK1B and the MAC address "macB" is displayed. When the QR Code displayed on the printer 100 is captured by the camera 18, the CPU 32 decodes this QR Code and obtains information corresponding to this QR Code (that is, either a combination of the public key PPK1A and the MAC address "macA" or a combination of the public key PPK1B and the MAC address "macB") (see T120 and T130 of FIG. 3).

In S12, the CPU 32 determines whether the terminal 10 has established the AP connection. Specifically, the CPU 32 determines that the AP connection has been established (YES to S12) in a case where an AP connection flag (not shown) in the memory 34 indicates ON, and proceeds to S20. On the other hand, the CPU 32 determines that the AP connection has not been established (NO to S12) in a case where the AP connection flag indicates OFF and proceeds to S40.

In S20, the CPU 32 sends the AReq to the printer 100 via the Wi-Fi I/F 16 (see T210 of FIG. 4). As aforementioned, the AReq includes the capability indicating that the terminal 10 can only operate as the Configurator.

In S22, the CPU 32 receives the ARes from the printer 100 via the Wi-Fi I/F 16 (see T220 of FIG. 4).

In S24, the CPU 32 determines whether an error has occurred based on the information included in the ARes. Specifically, the CPU 32 determines that an error has occurred (YES to S24) in a case where the ARes includes a code "STATUS_AUTH_FAILURE", and proceeds to S40. Here, the code of "STATUS_AUTH_FAILURE" is a code indicating that the Auth had failed. On the other hand, the CPU 32 determines that no error has occurred (NO to S24) in a case where the ARes includes a code "STATUS_OK", and proceeds to S26. Here, the code of "STATUS_OK" is a code indicating that no error has occurred, that is, that the process had been executed normally.

In S26, the CPU 32 determines whether the AP connection established between the terminal 10 and the AP 6 is a DPP connection. Specifically, the CPU 32 determines that the AP connection is a DPP connection (YES to S26) in a case where the CO for terminal including the SC for terminal is stored in the memory 34, and proceeds to S28. On the other hand, the CPU 32 determines that the AP connection is not a DPP connection (that is, the AP connection is a certain Wi-Fi connection) (NO to S26) in a case where the SSID and the password of the wireless network formed by the AP 6 are stored in the memory 34, and proceeds to S30.

In S28, the CPU 32 executes the Config with the printer 100. Specifically, the CPU 32 receives the CReq from the printer 100 via the Wi-Fi I/F 16 (see T300 of FIG. 5). After the execution of the Config, the CPU 32 generates the CO for printer including the SC for printer (see T302 to T304) and sends the CRes including this CO for printer and a code "netRole=sta" to the printer 100 via the Wi-Fi I/F 16 (see T310). The code "netRole=sta" indicates that the printer 100 is to participate in the wireless network formed by the AP 6 as a station (that is, a child station).

The process of S30 is similar to the process of S28 except that the CO for printer included in the CRes to be sent to the printer 100 includes the SSID and the password of the wireless network formed by the AP 6 instead of the SC for printer. In this case, the printer 100 does not execute the NA with the AP 6 (T40 of FIG. 2, FIG. 6) and establishes the AP connection in conformity with the certain Wi-Fi scheme (that is, by using the SSID and the password).

In S32, the CPU 32 determines whether an error has occurred based on the information communicated in the Config with the printer 100. Specifically, the CPU 32 determines that an error has occurred (YES to S32) in a case where a Configuration Result including a code "STATUS_CONFIG_REJECTED" is received from the printer 100 after having sent the CRes to the printer 100, and proceeds to S40. Here, the code of "STATUS_CONFIG_REJECTED" is a code indicating that the Config had been rejected. On the other hand, the CPU 32 determines that no error has occurred (NO to S32) in a case where a Configuration Result including a code "STATUS_OK" is received from the printer 100 after having sent the CRes to the printer 100 and terminates the process of FIG. 7.

In S40, the CPU 32 sends a G/O Negotiation Request (hereinafter abbreviated to "GNReq") to the printer 100 via the Wi-Fi I/F 16. The GNReq is a signal for requesting the printer 100 execute G/O negotiation of the WFD scheme. The G/O negotiation is communication for determining which one of the terminal 10 and the printer 100 is to be a G/O. The GNReq includes an Intent value of the terminal 10 that is preset in the terminal 10. The Intent value is a value which is one of values from 1 to 15, and indicates likeliness of becoming the G/O. A larger Intent value indicates greater likeliness of becoming the G/O.

In S42, the CPU 32 determines whether or not a G/O Negotiation Response (hereinafter abbreviated to "GNRes") has been received from the printer 100. The CPU 32 proceeds to S44 in a case of determining that the GNRes has been received from the printer 100 (YES to S42). Here, the GNRes includes an Intent value of the printer 100 that is preset in the printer 100. The CPU 32 compares the Intent value of the terminal 10 and the Intent value of the printer 100 and determines which one of the terminal 10 and the printer 100 is to be the G/O.

On the other hand, the CPU 32 determines that the GNRes was not received from the printer 100 (NO to S42) in a case where the GNRes is not received from the printer 100 even after a predetermined time has elapsed since when the GNReq was sent to the printer 100 and proceeds to S50.

In S44, the CPU 32 executes the Auth and Config with the printer 100. In the Auth, the device that was determined in the G/O negotiation to be the G/O is determined to operate as the Configurator, and the device that was determined to be the CL is determined to operate as the Enrollee. Further, in the Config, the CO communicated between the terminal 10 and the printer 100 includes a SSID and a password of a wireless network formed by the device that is to be the G/O. For example, in a case where the terminal 10 has been determined to be the G/O, the terminal 10 operates as the Configurator and sends the CO for printer including the SSID and the password of the wireless network formed by the terminal 10 to the printer 100. Further, for example, in a case where the printer 100 has been determined to be the G/O, the terminal 10 operates as the Enrollee and receives, from the printer 100, the CO for terminal including the SSID and the password of the wireless network formed by the printer 100.

In S46, the CPU 32 executes various types of communication in conformity with the WFD scheme such as Authentication, Association, and 4-way handshake with the printer 100 via the Wi-Fi I/F 16. Then, in the course of these various types of communication, the CPU 32 executes authentication using the SSID and the password of the network formed by the device operating as the G/O (i.e., the terminal 10 or the printer 100), and establishes the WFD connection with the printer 100 in a case where the authentication succeeds. Accordingly, a wireless network to which both the terminal 10 and the printer 100 belong is formed. That is, the terminal 10 can directly execute wireless communication with the printer 100 (such as communication of print data) not via the AP 6. When the process of S46 is completed, the process of FIG. 7 is terminated.

In S50, the CPU 32 causes the display unit 14 to display a notification screen. This notification screen includes both a message for execution of an operation for establishing the AP connection between the terminal 10 and the AP 6 and a message for execution of an operation for setting a state of the printer 100 to a state in standby for establishment of the WFD connection. When the process of S50 is completed, the process of FIG. 7 is terminated.

Figure 8:
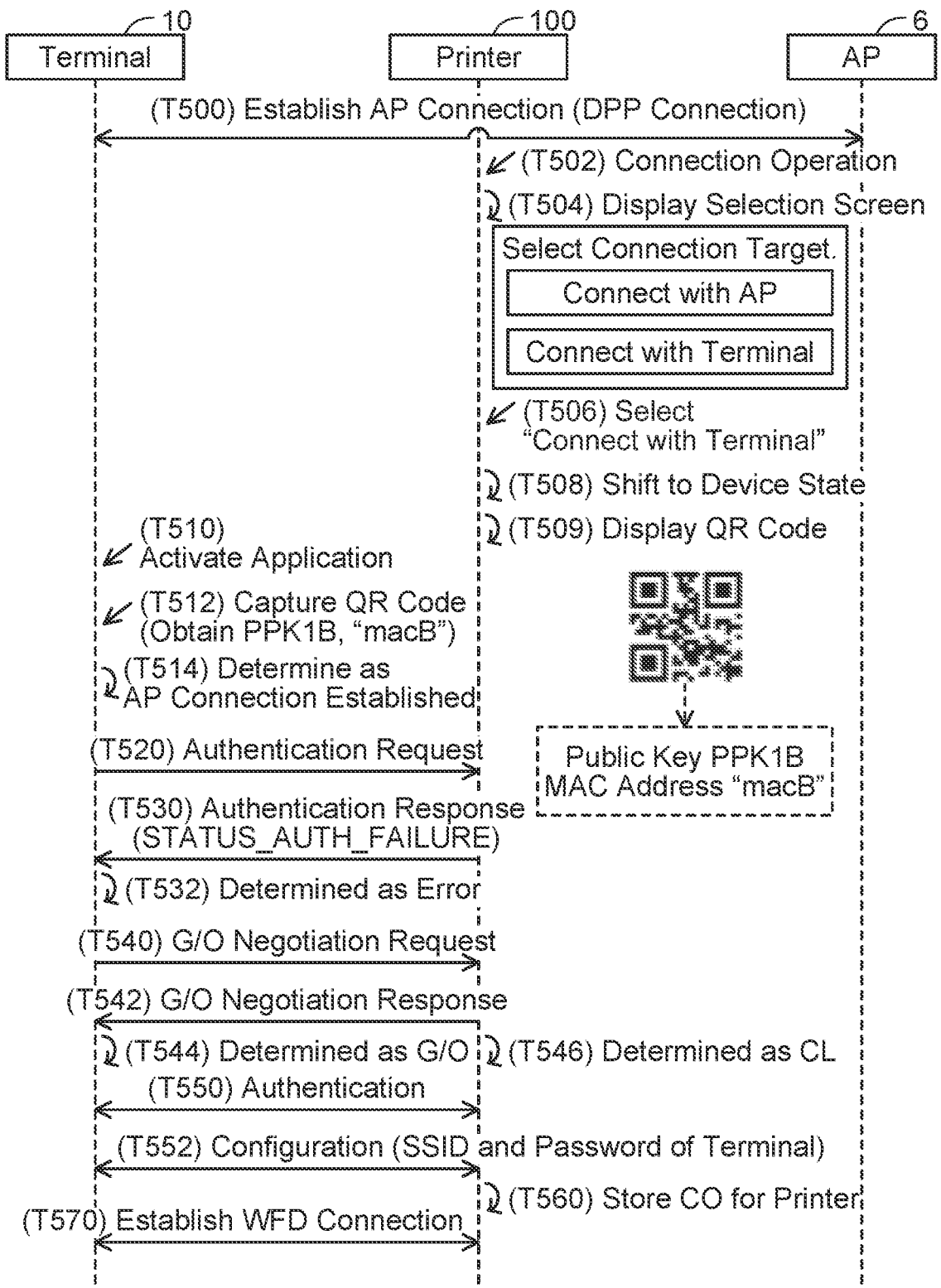
FIG. 8 shows a sequence diagram of Case A in which an AP connection has been established between the terminal and the access point.

Case A; FIG. 8

Next, specific cases realized by the process of FIG. 7 will be described. Firstly, Case A in which the AP connection has been established (i.e. the AP connection is present) between the terminal 10 and the AP 6 will be described with reference to FIG. 8. As shown in T500, the DPP connection has been established between the terminal 10 and the AP 6. In a variant, the certain Wi-Fi connection may be established (i.e. the certain Wi-Fi connection may be present) between the terminal 10 and the AP 6.

In T502, the printer 100 accepts a connection operation from the user. The connection operation is an operation that becomes a trigger for initiating settings for establishing a Wi-Fi connection between the printer 100 and another device (i.e., the AP 6 or the terminal 10).

In T504, the printer 100 displays a selection screen on the display unit 114. The selection screen includes a message for execution of operation for selecting a device with which the printer 100 should establish the Wi-Fi connection (i.e., a connection counterpart), an AP button for selecting the AP 6 as the connection counterpart (i.e., a letter string "connect with AP"), and a terminal button for selecting the terminal 10 as the connection counterpart (i.e., a letter string "connect with terminal").

In a case where the terminal button is selected by the user in T506, the printer 100 shifts to a device state of the WFD scheme in T508. That is, the printer 100 shifts from a state being incapable of executing various types of communication in conformity with the WFD scheme (such as sending the GNRes) to a state capable of executing these various types of communication (i.e., the device state). Then, in T509, the printer 100 displays the QR Code obtained by coding the public key PPK1B and the MAC address "macB" for establishing the WFD connection on the display unit 114. Here, the QR Code may be generated by the printer 100 in T509 or may be prestored in the memory 134 of the printer 100. The same applies to QR Code in other cases to be described hereinafter (such as Case B of FIG. 9).

In response to accepting the operation from the user in T510, the terminal 10 activates the app 38. Then, in T512, the terminal 10 uses the camera 18 to capture the QR Code displayed on the printer 100. Then, the terminal 10 decodes the QR Code to obtain the public key PPK1B and the MAC address "macB" of the printer 100 (S10 of FIG. 7).

After the decode, in T514, the terminal 10 determines that the AP connection has been established (YES to S12), then sends the AReq in which the public key PPK1B is used to the printer 100 in T520 (S20). The public key PPK1B, the private key psk1b, and the MAC address "macB" of the printer 100 are used in the processes of the DPP scheme that are to take place hereafter. Aside from this point, the processes of the DPP scheme are similar to those of FIGS. 2 to 6.

In the present case, the printer 100 stands by for establishment of the WFD connection while operating in the device state of the WFD scheme (see T508). That is, the printer 100 is not in the G/O state nor the CL state. If the printer 100 is in the G/O state, the printer 100 can determine to operate as the Configurator. Further, if the printer 100 is in the CL state, the printer 100 can determine to operate as the Enrollee. That is, in these cases, the printer 100 can determine the value of the capability included in the ARes. However, if the printer 100 is in the device state, the printer 100 cannot determine the value of the capability included in the ARes. As such, when the printer 100 receives the AReq from the terminal 10 in T520, the printer 100 sends the ARes including the code "STATUS_AUTH_FAILURE" to the terminal 10 in T530.

The terminal 10 receives the ARes including the code "STATUS_AUTH_FAILURE" from the printer 100 in T530 (S22) and determines that an error has occurred in T532 (YES to S24).

The terminal 10 sends the GNReq to the printer 100 in T540 (S40) in response to occurrence of the error, and receives the GNRes from the printer 100 in T542 (YES to S42). As a result, the G/O negotiation is executed between the terminal 10 and the printer 100, and in the present case, the terminal 10 is determined to be the G/O in T544 and the printer 100 is determined to be the CL in T546. Then, the terminal 10 determines the SSID and the password of the wireless network in which the terminal 10 operates as the G/O. In a variant, the printer 100 may be determined to be the G/O and the terminal 10 may be determined to be the CL.

After this, the terminal 10 executes the Auth in T550 (S44). In the Auth, the terminal 10 determined to be the G/O is determined to operate as the Configurator and the printer 100 determined to be the CL is determined to operate as the Enrollee. That is, in the Auth of T550, the terminal 10 sends the AReq including the capability indicating that it is capable of operating only as the Configurator to the printer 100. Further, the terminal 10 receives the ARes including the capability indicating that the printer 100 is capable of operating only as the Enrollee from the printer 100.

Next, in T552, the terminal 10 executes the Config (S44). In the Config, the terminal 10 operating as the Configurator generates the CO for printer and sends the CRes including this CO for printer to the printer 100. This CO for printer includes the SSID and the password determined by the terminal 10 operating as the G/O.

When the CRes including the CO for printer is received from the terminal 10, the printer 100 stores the CO for printer in T560. Then, the printer 100 uses the CO for printer in T570 (more specifically, uses the SSID and the password included in the CO for printer) to establish the WFD connection with the terminal 10 (S46).

Figure 9:
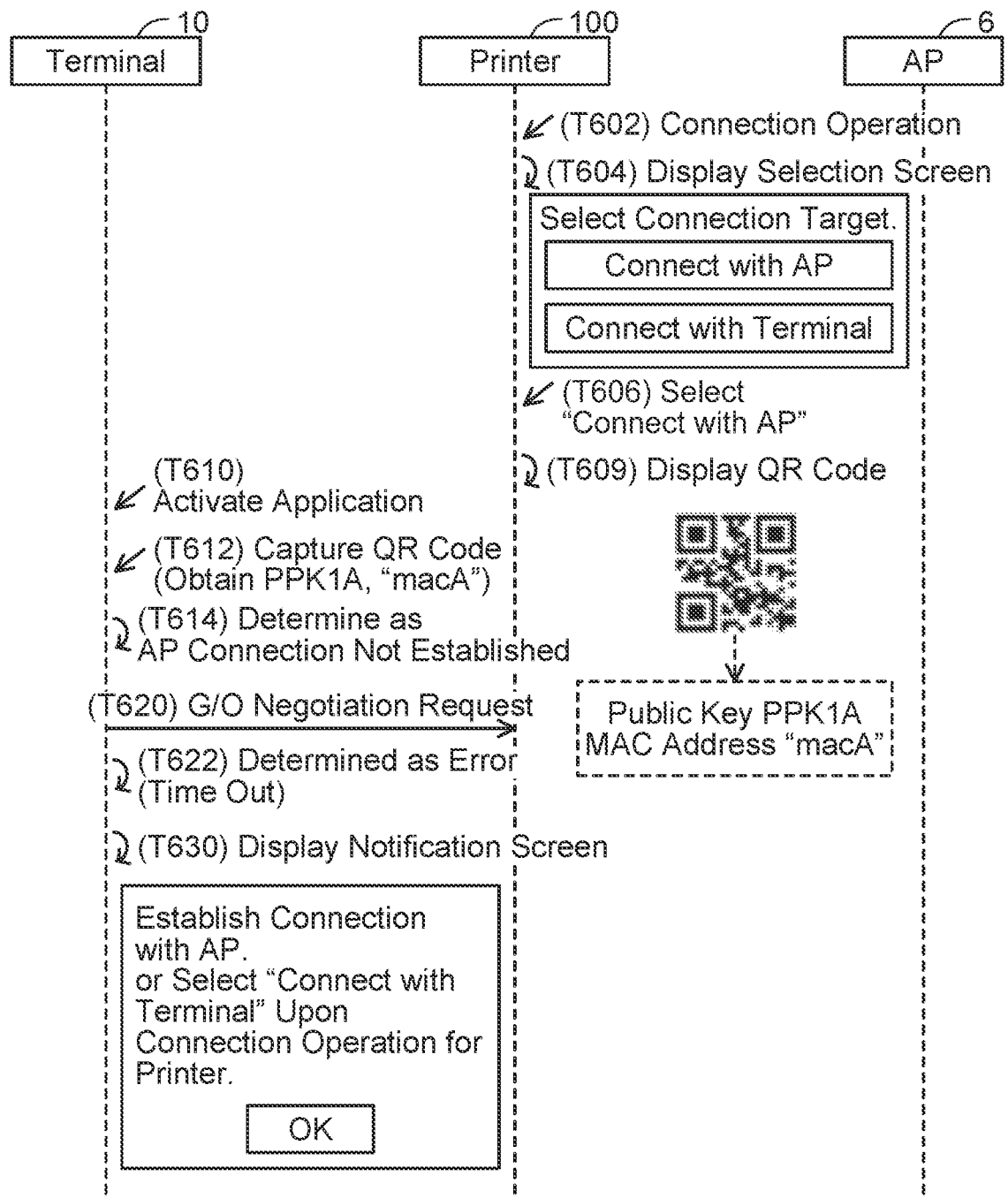
FIG. 9 shows a sequence diagram of Case B in which an AP connection has not been established between the terminal and the access point.

Case B; FIG. 9

Next, Case B in which the AP connection has not been established between the terminal 10 and the AP 6 will be described with reference to FIG. 9. Processes of T602 to T604 are similar to the processes of T502 to T504 of FIG. 8. In a case where the AP button is selected by the user in T606, the printer 100 displays the QR Code obtained by coding the public key PPK1A and the MAC address "macA" for establishing the AP connection on the display unit 114 in T609.

Processes of T610 to T612 are similar to the processes of T510 to T512 of FIG. 8 except that the public key and the MAC address are different. In T614, the terminal 10 determines that the AP connection has not been established with the AP 6 (NO to S12 of FIG. 7). In this case, the terminal 10 sends the GNReq to the printer 100 in T620 (S40).

In the present case, the printer 100 is not operating in the device state of the WFD scheme. That is, the printer 100 is incapable of executing the various types of communication in conformity with the WFD scheme (such as sending the GNRes). Accordingly, the printer 100 does not send the GNRes to the terminal 10 even if the printer 100 receives the GNReq from the terminal 10.

Since the terminal 10 does not receive the GNRes from the printer 100, the terminal 10 determines in T622 that an error has occurred (NO to S42). In this case, the terminal 10 displays the notification screen in T630 (S50). The notification screen includes the message for execution of an operation for establishing the AP connection between the terminal 10 and the AP 6, the message for execution of an operation for setting the state of the printer 100 to the state in standby for the establishment of the WFD connection (i.e., a message for selecting the terminal button in the selection screen of T604), and an "OK" button.

Effects of Present Embodiment

According to the present embodiment, the terminal 10 sends the AReq to the printer 100 (S20 of FIGS. 7 and T520 of FIG. 8), and execute the communication for establishing the AP connection between the printer 100 and the AP 6 (i.e., receiving the ARes, receiving the CReq, sending the CRes, and receiving the Configuration Result) with the printer 100 (S22 to S30). Since the CO for printer is sent to the printer 100 in the case where the communication for establishing the AP connection succeeds, the AP connection can be established between the printer 100 and the AP 6. On the other hand, in the case where the communication for establishing the AP connection fails, the terminal 10 sends the GNReq to the printer 100 (S40 and T540) and executes the communication with the printer 100 for establishing the WFD connection between the terminal 10 and the printer 100 (S42, S44, T542, T550, and T552). Then, the terminal 10 uses the CO for printer or the CO for terminal to establish the WFD connection between the terminal 10 and the printer 100 (S46 and T570). Accordingly, the terminal 10 provided with the Wi-Fi I/F 16 capable of executing wireless communication in conformity with a plurality of communication schemes of the Wi-Fi standard can suitably cause the Wi-Fi connection of the printer 100 to be established.

Especially, the terminal 10 cannot know which one of the AP button and the terminal button was selected by the user in the selection screen of the printer 100 (see T504 of FIG. 8). Thus, in the present embodiment, the terminal 10 firstly executes the communication for establishing the AP connection between the printer 100 and the AP 6. Then, in the case where this communication fails due to the terminal button having been selected in the selection screen (T532 of FIG. 8), the terminal 10 automatically executes the communication for establishing the WFD connection between the terminal 10 and the printer 100 (T540) without a need to accept any instruction from the user. Accordingly, user convenience is improved.

The terminal 10 determines whether the terminal 10 has established the AP connection (S12 of FIG. 7), and in the case of determining that the terminal 10 has established the AP connection (YES to S12), the terminal 10 sends the AReq to the printer 100 which is a trigger for establishing the AP connection between the printer 100 and the AP 6 (S20 and T520 of FIG. 8). On the other hand, in the case of determining that the terminal 10 has not established AP connection (NO to S12), the terminal 10 does not send the AReq to the printer 100 (i.e., the terminal 10 does not execute S20). This is because even if the AP connection is established between the printer 100 and the AP 6, the terminal 10 cannot execute communication with the printer 100 via the AP 6 due to the terminal 10 not having established any AP connection. According to the configuration, execution of wasteful processes can be suppressed.

The terminal 10 sends the GNReq to the printer 100 (S40 and T620 of FIG. 9) in the case of determining that the terminal 10 has not established AP connection (NO to S12 of FIG. 7). Then, the terminal 10 execute the communication with the printer 100 for establishing the WFD connection between the terminal 10 and the printer 100 (i.e., receiving the GNRes, sending the AReq, receiving the ARes, sending or receiving the CReq, and receiving or sending the CRes) (S42 to S44). In the case where the communication succeeds, the terminal 10 can establish the WFD connection between the terminal 10 and the printer 100 (S46). Accordingly, the terminal 10 provided with the Wi-Fi I/F 16 capable of executing wireless communication in conformity with a plurality of communication schemes of the Wi-Fi standard can suitably cause the Wi-Fi connection of the printer 100 to be established.

In the case where the communication for establishing the WFD connection between the terminal 10 and the printer 100 fails (NO to S42 of FIG. 7), the terminal 10 displays the notification screen (S50 and T630 of FIG. 9). The notification screen includes the message for execution of operating for establishing the AP connection between the terminal 10 and the AP 6. The user can operate for causing the AP connection to be established between the terminal 10 and the AP 6 by following this message, and thereafter can select the AP button included in the selection screen of the printer 100 (see T504 of FIG. 8) again. In this case, the AP connection is established between the printer 100 and the AP 6, and the terminal 10 can execute communication with the printer 100 via the AP 6. Further, the notification screen includes the message for execution of operating for setting the state of the printer 100 to the state in standby for establishment of the WFD connection. The user can select the WFD button included in the selection screen of the printer 100 following this message. In this case, the WFD connection is established between the terminal 10 and the printer 100, and the terminal 10 can execute communication with the printer 100 not via the AP 6.

In the case of determining that the terminal 10 has established the AP connection, the terminal 10 further determines whether this AP connection is the DPP connection or the certain Wi-Fi connection (S26 of FIG. 7). In the case where the AP connection is the DPP connection (YES to S26), the terminal 10 generates the CO for printer including the SC for printer in the Config and sends the CRes including this CO for printer to the printer 100 (S28). Accordingly, the printer 100 can suitably establish the DPP connection with the AP 6. On the other hand, in the case where the AP connection is the certain Wi-Fi connection (NO to S26), the terminal 10 generates the CO for printer including the SSID and the password of the wireless network formed by the AP 6 in the Config and sends the CRes including this CO for printer to the printer 100 (S30). Accordingly, the printer 100 can suitably establish the certain Wi-Fi connection with the AP 6. As above, the terminal 10 can send a suitable CO for printer to the printer 100 in conformity with whether the DPP connection with the AP 6 has been established or the certain Wi-Fi connection with the AP 6 has been established.

Corresponding Relationship

The terminal 10 and the printer 100 are respectively an example of a "terminal device" and a "communication device". The Wi-Fi I/F 16 is an example of a "wireless interface". The communication scheme for executing communication via the AP 6 (i.e., the communication scheme for establishing the AP connection between the printer 100 and the AP 6) is an example of a "first communication scheme". The WFD scheme is an example of a "second communication scheme". The AReq sent in T520 of FIG. 8, the GNReq sent in T540 of FIG. 8, and the GNReq sent in T620 of FIG. 9 are respectively an example of a "first request signal", a "second request signal", and a "third request signal". The communication executed in T520 to T530 and the communication executed in T540 to T542 and T550 to T552 of FIG. 8 are respectively an example of "first-type communication" and "second-type communication". Receiving the ARes including the code "STATUS_AUTH_FAILURE" (i.e., YES to S24 of FIG. 7) is an example of a "case where it is determined that the first-type communication has been failed". Further, not receiving the GNRes (i.e., NO to S32) is an example of a "case where it is determined that the second-type communication has been failed". The CO for printer sent in S28 or S30 of FIG. 7 is an example of "first connection information". The CO for printer or the CO for terminal communicated in S44 is an example of "second connection information". The wireless connection between the printer 100 and the AP 6 and the WFD connection between the terminal 10 and the printer 100 are respectively an example of a "first wireless connection" and a "second wireless connection". The DPP connection between the terminal 10 and the AP 6 and the certain Wi-Fi connection between the terminal 10 and the AP 6 are respectively an example of a "first-type wireless connection" and a "second-type wireless connection". The message for execution of operating for establishing the AP connection between the terminal 10 and the AP 6 and the message for execution of operating for setting the state of the printer 100 to the state in standby for the establishment of the WFD connection in the notification screen displayed in S50 of FIG. 7 are respectively an example of "first notification information" and "second notification information". The state of the printer 100 in standby for establishing the connection with the AP 6 and the state of the printer 100 in standby for establishing the WFD connection with the terminal 10 are respectively an example of a "first state" and a "second state".

The process of S10, the process of S20, and the process of S40 in FIG. 7 are respectively an example of "obtain a public key", "send a first request signal", and "send a second request signal". The processes of S22 to S30, the processes of S42 to S44, and the process of S46 are respectively an example of "execute a first-type communication", "execute a second-type communication", and "establish the second wireless connection". The process of S 24 and S32 are an example of "determine whether the first-type communication has been failed". The process of S12, the process of S26, the process of S40, and the processes of S42 to S44 are respectively an example of "determine whether a third wireless connection has been established", "determine whether the third wireless connection is a first-type wireless connection or a second-type wireless connection", "send a third request signal", and "execute the second-type communication". The process of S50 of FIG. 7 is an example of "display first notification information" and "display second notification information". The process of S42 is an example of "determine whether the second-type communication has been failed".

Second Embodiment

Next, a second embodiment will be described. In this embodiment, the printer 100 shifts to the G/O state instead of the device state in the case where the terminal button included in the selection screen is selected. That is, the printer 100 autonomously shifts to the G/O state without executing the G/O negotiation. Further, in the present embodiment, the terminal 10 executes the following in the determination of S24 of FIG. 7. That is, the terminal 10 determines that an error has occurred (YES to S24) in a case where the capability included in the ARes received in S22 indicates being capable of operating only as the Configurator. This is because since the terminal 10 is also attempting to operate as the Configurator (i.e., the AReq of S20 includes the capability indicating the value for being capable of operating only as the Configurator), role sharing between the terminal 10 and the printer 100 will fail.

Figure 10:
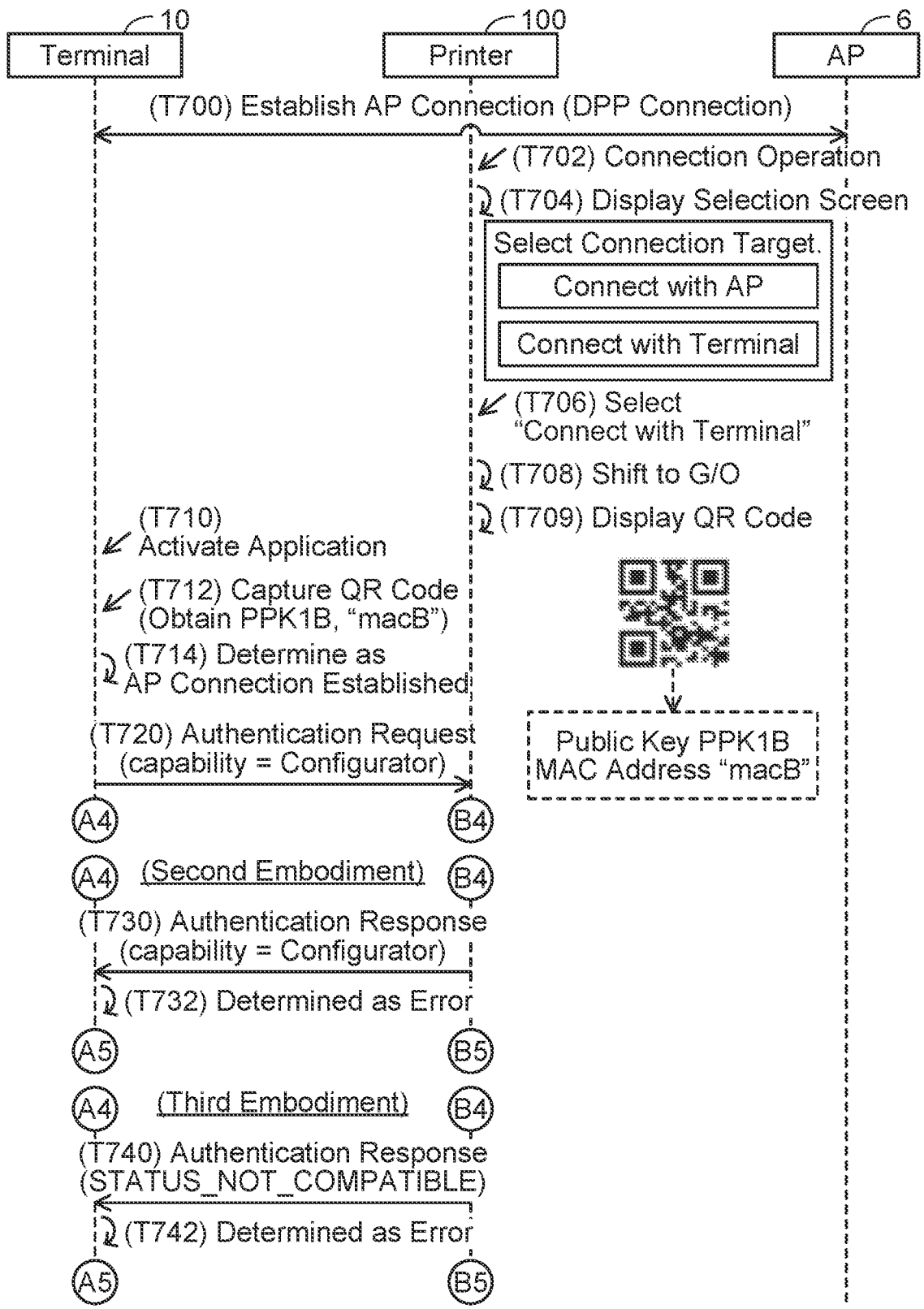
FIG. 10 shows a sequence diagram of the second to fourth embodiments.
Figure 11:
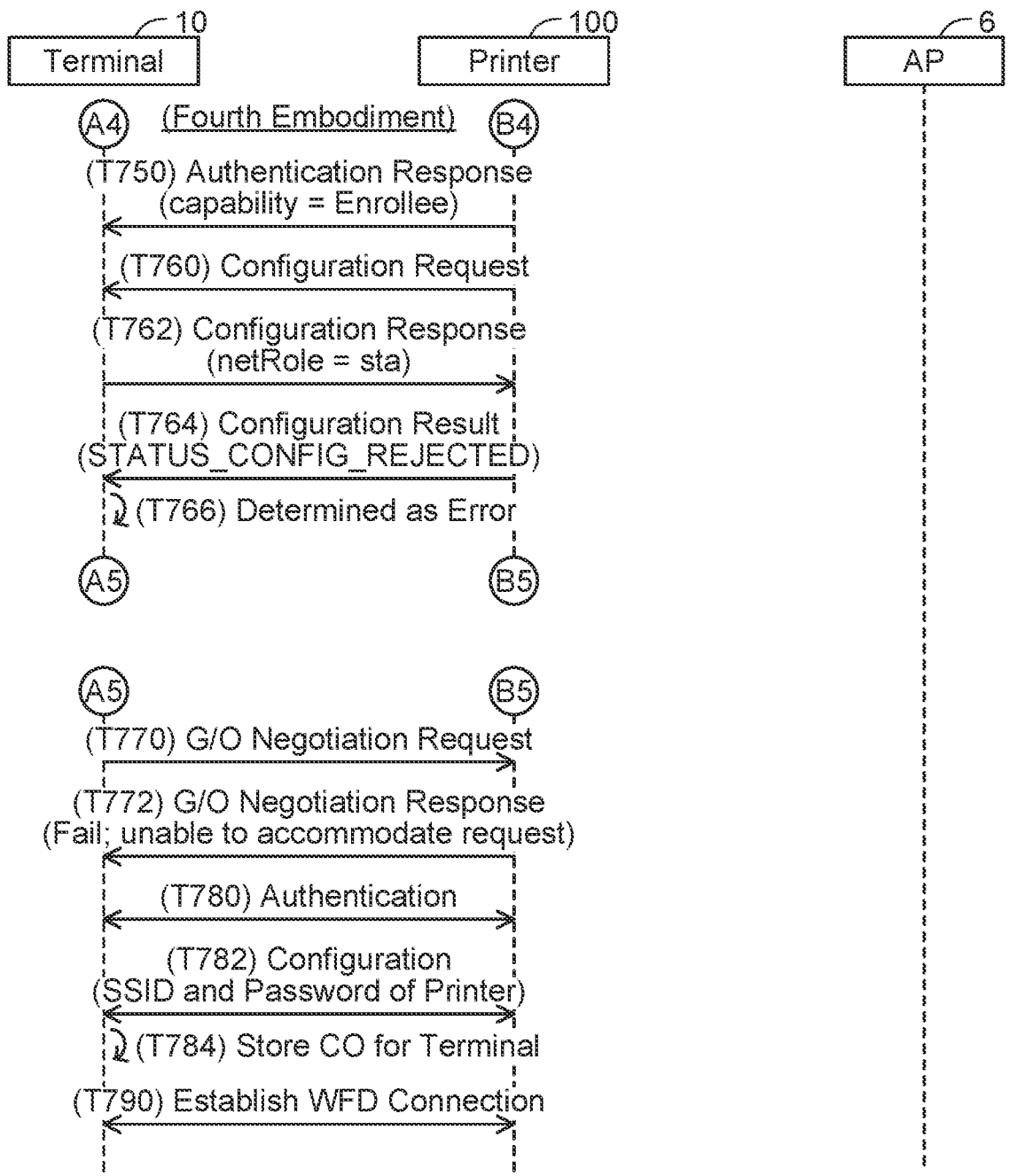
FIG. 11 shows a sequence diagram in continuation from FIG. 10.

Specific Case; FIGS. 10 and 11

As shown in T700 of FIG. 10, the DPP connection has been established between the terminal 10 and the AP 6. In a variant, the certain Wi-Fi connection may be established between the terminal 10 and the AP 6. Processes of T702 to T706 are similar to the processes of T502 to T506 of FIG. 8. The printer 100 shifts to the G/O state of the WFD scheme in T708. Then, the printer 100 determines the SSID and the password of the wireless network in which the printer 100 operates as the G/O. A process of T709 is similar to the process of T509.

Processes of T710 to T720 are similar to the processes of T510 to T520. The terminal 10 sends the AReq including the capability indicating that the terminal 10 is capable of operating only as the Configurator to the printer 100 in T720 (S20).

In response to receiving the AReq from the terminal 10 in T720, the printer 100 sends the ARes to the terminal 10 in T730. Here, since the printer 100 is operating as the G/O, the ARes includes the capability indicating that the printer 100 is capable of operating as the Configurator.

When the ARes is received from the printer 100 in T730, the terminal 10 determines that an error has occurred in T732 (YES to S24) since both the terminal 10 and the printer 100 are attempting to operate as the Configurator. After this, in T770 of FIG. 11, the terminal 10 sends the GNReq to the printer 100 (S40).

When the GNReq is received from the terminal 10 in T770, the printer 100 sends, to the terminal 10 in T772, the GNRes including a code "Fail; unable to accommodate request" indicating that the printer 100 cannot respond to the execution request of the G/O negotiation. This is because the printer 100 is already operating as the G/O and there is no need to execute the G/O negotiation.

When the GNRes is received from the printer 100 in T772 (S42), since the GNRes includes the code "Fail; unable to accommodate request", the terminal 10 can acknowledge that the printer 100 is already operating as the G/O. In this case, the terminal 10 determines to operate as the CL, and executes the Auth in T780 (S44). In this Auth, the printer 100 operating as the G/O is determined to operate as the Configurator and the terminal 10 is determined to operate as the Enrollee. That is, since the terminal 10 had determined to operate as the CL, the terminal 10 sends the AReq including the capability indicating being capable of operating only as the Enrollee to the printer 100 in the Auth of T780. Further, the terminal 10 receives the ARes including the capability indicating being capable of operating only as the Configurator from the printer 100.

Next, the terminal 10 executes the Config in T782 (S44). In the Config, the terminal 10 operating as the Enrollee receives the CRes including the CO for terminal generated by the printer 100 from the printer 100. This CO for terminal includes the SSID and the password determined by the printer 100 operating as the G/O.

When the CRes including the CO for terminal from the printer 100 in T782, the terminal 10 stores the CO for terminal in T784. Then, in T790, the terminal 10 uses the CO for terminal (more specifically, the SSID and the password included in the CO for terminal) and establishes the WFD connection with the printer 100 (S46).

In this embodiment as well, the terminal 10 can establish the WFD connection between the terminal 10 and the printer 100 (T790 of FIG. 11) even in the case where the communication for establishing the AP connection between the printer 100 and the AP 6 fails (T732 of FIG. 10). In the present embodiment, receiving the ARes including the capability indicating that the printer 100 is capable of operating only as the Configurator is an example of the "case where the first-type communication fails".

Third Embodiment

Next, a third embodiment will be described. Similar to the second embodiment, the printer 100 shifts to the G/O state in the case where the terminal button included in the selection screen is selected. Further, the terminal 10 executes the following in the determination of S24 of FIG. 7. That is, the terminal 10 determines that an error has occurred (YES to S24) in a case where the ARes received in S22 includes a code "STATUS_NOT_COMPATIBLE". "STATUS_NOT_COMPATIBLE" is a code indicating that the role sharing failed.

Specific Case; FIGS. 10 and 11

Processes of T700 to T720 of FIG. 10 are similar to those of the second embodiment. The printer 100 sends the ARes to the terminal 10 in T740 in response to receiving the AReq from the terminal 10 in T720. This ARes includes the code "STATUS_NOT_COMPATIBLE". This is because both the terminal 10 and the printer 100 are attempting to operate as the Configurator.

When the ARes including the code "STATUS_NOT_COMPATIBLE" is received from the printer 100 in T740, the terminal 10 determines that an error has occurred in T742 (YES to S24). Processes of T770 to T790 of FIG. 11 executed thereafter are similar to those of the second embodiment.

According to the present embodiment as well, the terminal 10 can establish the WFD connection between the terminal 10 and the printer 100 (T790 of FIG. 11) even in the case where the communication for establishing the AP connection between the printer 100 and the AP 6 fails (T742 of FIG. 10). In the present embodiment, receiving the ARes including the code "STATUS_NOT_COMPATIBLE" from the printer 100 is an example of the "case where the first-type communication fails".

Fourth Embodiment

Next, a fourth embodiment will be described. Similar to the second embodiment, the printer 100 shifts to the G/O state in the case where the terminal button included in the selection screen is selected. Further, in the present embodiment, a case in which the determination that an error has occurred is made in S24 of FIG. 7 is not assumed, and a case in which the determination that an error has occurred is made in S32 of FIG. 7 is assumed.

Specific Case; FIGS. 10 and 11

Processes of T700 to T720 of FIG. 10 are similar to those of the second embodiment. The printer 100 sends the ARes to the terminal 10 in T750 of FIG. 11 in response to receiving the AReq from the terminal 10 in T720. Here, based on the capability in the AReq, the printer 100 can acknowledge that the terminal 10 is to operate as the Configurator. Accordingly, the printer 100 determines to operate as the Enrollee although it is operating as the G/O. As such, the printer 100 sends the ARes including the capability indicating that the printer 100 is capable of operating only as the Enrollee to the terminal 10.

When the ARes is received from the printer 100 in T750, the terminal 10 can acknowledge based on the capability in the ARes that the printer 100 is to operate as the Enrollee. Accordingly, the terminal 10 determines that no error has occurred since the role sharing succeeded.

In response to receiving the CReq from the printer 100 operating as the Enrollee in T760, the terminal 10 sends the CRes to the printer 100 in T762. This CRes includes a code "netRole=sta".

When the CRes is received from the terminal 10 in T762, the printer 100 can acknowledge based on the code "netRole=sta" in the CRes that the printer 100 is requested to operate as a child station. Since the printer 100 is already operating as the G/O (i.e., a parent station), it cannot respond as requested. Accordingly, the printer 100 sends the Configuration Result including the code "STATUS_CONFIG_REJECTED" to the terminal 10 in T764.

When the Configuration Result including the code "STATUS_CONFIG_REJECTED" is received from the printer 100 in T764, the terminal 10 determines that an error has occurred in T766 (YES to S32). Processes of T770 to T790 executed thereafter are similar to those of the second embodiment.

According to the present embodiment as well, the terminal 10 can establish the WFD connection between the terminal 10 and the printer 100 (T790 of FIG. 11) even in the case where the communication for establishing the AP connection between the printer 100 and the AP 6 fails (T766 of FIG. 11). In the present embodiment, receiving the Configuration Result including the code "STATUS_CONFIG_REJECTED" from the printer 100 is an example of the "case where the first-type communication fails".

Fifth Embodiment

Next, a fifth embodiment will be described. In the present embodiment, firstly the terminal 10 executes the communication for establishing the WFD connection between the terminal 10 and the printer 100, and executes the communication for establishing the AP connection between the printer 100 and the AP 6 in a case where the former communication fails.

Process of Terminal; FIG. 12

In the present embodiment, process of FIG. 12 is executed instead of the process of FIG. 7. Processes of S110 to S114 are similar to the processes of S10, S40, and S42 of FIG. 7. That is, after having executed the BS with the printer 100, the terminal 10 firstly executes the communication for establishing the WFD connection between the terminal 10 and the printer 100. CPU32 proceeds to S120 in a case of YES to S114 and proceeds to S130 in a case of NO to S114. Processes of S120 to S122 are similar to the processes of S44 to S46. Further, processes of S130 to S140 are similar to the processes of S12, S20 to S22, and S26 to S30. A process of S150 is similar to the process of S50.

Case C; FIG. 13

Next, specific cases realized by the process of FIG. 12 will be described. Firstly, Case C in which the AP connection has not been established between the terminal 10 and the AP 6 will be described with reference to FIG. 13. Processes of T802 to T812 (S110 of FIG. 12) are similar to the processes of T502 to T512 of FIG. 8. Further, processes of T820 to T850 (S112, YES to S114, S120, and S122) are similar to the processes of T540 to T570. In a variant, the printer 100 may shift to the G/O state instead of the device state in T808. In this case, the terminal 10 receives the GNRes including the code "Fail; unable to accommodate request" from the printer 100 in T822 (see T772 of FIG. 11). Further, in T832, the terminal 10 receives the CRes including the CO for terminal generated by the printer 100 from the printer 100 (see T782 to T784).

Case D; FIG. 14

Next, Case D in which the AP connection has been established between the terminal 10 and the AP 6 will be described with reference to FIG. 14. As shown in T900 of FIG. 14, the DPP connection has been established between the terminal 10 and the AP 6. In a variant, the certain Wi-Fi connection may be established between the terminal 10 and the AP 6. Processes of T902 to T912 (S110 of FIG. 12) are similar to the processes of T602 to T612 of FIG. 9. Further, processes of T920 to T922 (S112 and NO to S114) are similar to the processes of T620 to T622.

After this, the terminal 10 determines in T924 that the AP connection has been established (YES to S130 of FIG. 12). In this case, the terminal 10 sends the AReq to the printer 100 in T930 (S132) and receives the ARes from the printer 100 in T932 (S134). In the present case, the terminal 10 is determined to operate as the Configurator and the printer 100 is determined to operate as the Enrollee in the Auth.

When the Auth between the terminal 10 and the printer 100 is completed, the Config is executed between the terminal 10 and the printer 100 (S138). In the present case, since the DPP connection has been established between the terminal 10 and the AP 6 (YES to S136), the terminal 10 generates the CO for printer including the SC for printer in the Config and sends the CRes including this CO for printer to the printer 100. In a variant, in the case where the certain Wi-Fi connection has been established between the terminal 10 and the AP 6 (NO to S136 (certain Wi-Fi connection)), the terminal 10 may generate the CO for printer including the SSID and the password of the wireless network formed by the AP 6 and send the CRes including this CO for printer to the printer 100.

When the CRes including the CO for printer is received from the terminal 10, the printer 100 stores the CO for printer in T940. Then, in T950, the printer 100 uses the CO for printer (more specifically, the SC for printer included in the CO for printer) and establishes the DPP connection with the AP 6 (see FIG. 6).

Case E; FIG. 15

Next, Case E in which the AP connection has not been established between the terminal 10 and the AP 6 will be described with reference to FIG. 15. Processes of T1002 to T1022 (S110, S112, and NO to S114 of FIG. 12) are similar to the processes of T902 to T922 of FIG. 14.

The terminal 10 determines in T1024 that the AP connection has not been established with the AP 6 (NO to S130). In this case, the terminal 10 displays the notification screen in T1030 (see S150, and T630 of FIG. 9).

Effects of Present Embodiment

According to the present embodiment, the terminal 10 sends the GNReq to the printer 100 (S110 of FIGS. 12 and T820 of FIG. 13), and execute the communication for establishing the WFD connection between the terminal 10 and the printer 100 (i.e., receiving the GNRes, sending the AReq, receiving the ARes, receiving (or sending) the CReq, sending (or receiving) the CRes, and receiving (or sending) the Configuration Result) with the printer 100 (S114 to S120, T822, T830, and T832). In the case where this communication succeeds, the terminal 10 uses the CO for printer or the CO for terminal to establish the WFD connection between the terminal 10 and the printer 100 (S122 and T850). On the other hand, in the case where this communication fails, the terminal 10 sends the AReq to the printer 100 (S132 and T930 of FIG. 14) and executes the communication with the printer 100 for establishing the AP connection between the printer 100 and the AP 6 (S134 to S140, T932 to T934, and T940). Accordingly, since the CO for printer is sent to the printer 100, the AP connection can be established between the printer 100 and the AP 6. Accordingly, the terminal 10 having the Wi-Fi I/F 16 configured capable of executing wireless communication in conformity with a plurality of communication schemes of the Wi-Fi standard can suitably cause the Wi-Fi connection of the printer 100 to be established.

The terminal 10 firstly executes the communication for establishing the WFD connection between the terminal 10 and the printer 100, and in the case where this communication fails, it autonomously executes the communication for establishing the AP connection between the printer 100 and the AP 6 without the need to accept any instruction from the user. Accordingly, the user convenience is improved. Further, the terminal 10 sends the AReq to the printer 100 (S132 and T930 of FIG. 14) in the case of determining that the terminal 10 has established the AP connection (YES to S130), but does not send the AReq to the printer 100 (i.e., does not execute S132) in the case of determining that the terminal 10 does not have established an AP connection (NO to S130). The execution of wasteful processes can be suppressed.

Corresponding Relationship

The GNReq sent in T820 of FIG. 13 and the AReq sent in T930 of FIG. 14 are respectively an example of the "second request signal" and the "first request signal". The communication executed in T822 and T830 to T832 of FIG. 13 and the communication executed in T930 to T934 of FIG. 14 are respectively an example of the "second-type communication" and the "first-type communication". Not receiving the GNRes (i.e., NO to S114) is an example of the "case where the second-type communication fails".

The process of S110, the process of S112, and the process of S132 in FIG. 12 are respectively an example of "obtain a public key", "send a second request signal", and "send a first request signal". The processes of S114 to S120, the process of S122, and the processes of S132 to S140 are respectively an example of "execute a second-type communication", "establish the second wireless connection", and "execute a first-type communication". The process of S114 is an example of "determine whether the second-type communication has been failed". The process of S130 and the process of S136 are respectively an example of "determine whether a third wireless connection has been established" and "determine whether the third wireless connection is a first-type wireless connection or a second-type wireless connection".

(Variant 1) Each of the terminal 10 and the printer 100 may further be provided with a wireless interface (such as a Bluetooth (BT) (Registered Trademark, BLUETOOTH SIG, INC.) I/F and a Near Field Communication (NFC) I/F) in conformity with a wireless scheme different from the Wi-Fi scheme (such as the BT scheme and a NFC scheme). In this case, the printer 100 may send information including a public key and a MAC address via the BT I/F of the printer 100, for example, instead of displaying the QR code in T100 of FIG. 3. In this case, the terminal 10 can receive this information via the BT I/F of the terminal 10. Further, in another variant, the printer 100 may send the information via the NFC I/F of the printer 100. In this case, the terminal 10 can receive this information via the NFC I/F of the terminal 10. In general terms, a method for executing "obtain a public key" is not particularly limited.

(Variant 2) The "second communication scheme" may not be the WFD scheme, and may be a so-called SoftAP scheme or an ad hoc scheme. In general terms, the "second communication scheme" simply needs to be a communication scheme for executing wireless communication with the communication device not via the access point.

(Variant 3) The determinations in S12 of FIGS. 7 and S130 of FIG. 12 may be executed prior to the BS with the printer 100, for example. That is, a timing of the "determine whether a third wireless connection has been established" is not particularly limited.

(Variant 4) After having completed S10 of FIG. 7, the terminal 10 may skip the determination of S12 and execute S20. In this variant, "determine whether a third wireless connection has been established", "send a third request signal", and "execute the second-type communication" can be omitted. Further, in the case of determining NO to S114 of FIG. 12, the terminal 10 may skip the determination of S130 and execute S132. In this variant, "determine whether a third wireless connection has been established" may be omitted. The program 36 and the app 38 may not include instruction corresponding to the process of S12 or S130.

(Variant 5) Without including both the message for execution of operation for establishing the SP connection between the terminal 10 and the AP 6 and the message for execution of operating for setting the state of the printer 100 to the state in standby for the establishment of the WFD connection, the notification screen may include only one of the above two messages. In this variant, one of "display first notification information" and "display second notification information" may be omitted. Further, in another variant, in the case of NO to S42 of FIG. 7 or in the case of NO to S130 of FIG. 12, the process may be terminated without executing S50 or S150. In this variant, both "display first notification information" and "display second notification information" may be omitted. By omitting at least one of the two messages, technique disclosed in the embodiments may be adopted to a device in which a display unit is small.

(Variant 6) In a system on a premise that the terminal 10 is incapable of establishing the certain Wi-Fi connection with the AP 6 but capable of establishing the DPP connection with the AP 6, S26 and S30 of FIG. 7 (or S136 and S140 of FIG. 12) may be omitted. Further, in a system on a premise that the terminal 10 is incapable of establishing the DPP connection with the AP 6 but capable of establishing the certain Wi-Fi connection with the AP 6, S26 and S28 of FIG. 7 (or S136 and S138 of FIG. 12) may be omitted. In these variants, "determine whether the third wireless connection is a first-type wireless connection or a second-type wireless connection" may be omitted. According to this variant, technique disclosed in the embodiments may be adopted to various types of systems in which available communication scheme is different from each other.

(Variant 7) The terminal 10 may not support the DPP scheme, and may execute respective types of communication such as the authentication request, authentication response, and connection information by obtaining a public key of the printer 100 in conformity with a scheme different from the DPP scheme.

(Variant 8) The "communication device" may be, instead of the printer 100, another device such as a scanner, multi-function peripheral, a portable terminal, a PC, and a server.

(Variant 9) At least one of these processes of FIGS. 2 to 15 may be implemented by hardware such as a logic circuit.

What is claimed is:

1. A terminal device comprising:
a wireless interface configured to execute a wireless communication in conformity with either of a first communication scheme of Wi-Fi standard and a second communication scheme of the Wi-Fi standard, the first communication scheme being for executing a wireless communication with a communication device via an access point, and the second communication scheme being for executing a wireless communication with the communication device not via the access point;
a controller configured to:
obtain a public key of the communication device;
send a first request signal in which the public key is used to the communication device via the wireless interface;
in response to the first request signal being sent to the communication device, execute a first-type communication in conformity with the first communication scheme with the communication device via the wireless interface, the first-type communication including sending first connection information to the communication device, and the first connection information being for establishing a first wireless connection between the communication device and the access point; and
in a case where an establishment of the first wireless connection-has been failed:
send a second request signal different from the first request signal to the communication device via the wireless interface;
in response to the second request signal being sent to the communication device, execute a second-type communication in conformity with the second communication scheme with the communication device via the wireless interface, the second-type communication including communicating second connection information with the communication device, and the second connection information being for establishing a second wireless connection between the terminal device and the communication device; and
after the second-type communication is executed with the communication device, establish the second wireless connection between the terminal device and the communication device via the wireless interface by using the second connection information.

2. The terminal device as in claim 1, wherein
in a case where a third wireless connection has been established between the terminal device and the access point, the controller sends the first request signal to the communication device, and
in a case where the third wireless connection has not been established between the terminal device and the access point, the first request signal is not sent to the communication device.

3. The terminal device as in claim 2, wherein
the controller is further configured to:
in the case where the third wireless connection has not been established between the terminal device and the access point, send a third request signal different from the first request signal to the communication device via the wireless interface; and
in response to the third request signal being sent to the communication device, execute the second-type communication in conformity with the second communication scheme with the communication device via the wireless interface.

4. The terminal device as in claim 3, further comprising a display unit,
wherein the controller is further configured to:
in a case where the third request signal is sent to the communication device and an establishment of the second wireless connection has failed, display first notification information on the display unit, the first notification information being for execution of an operation for establishing a wireless connection between the terminal device and the access point.

5. The terminal device as in claim 3, wherein
in a case where the communication device accepts an operation for establishing a wireless connection between the communication device and another device, the communication device operates either in a first state corresponding to the first communication scheme or in a second state corresponding to the second communication scheme,
the terminal device further comprises a display unit, and
the controller is further configured to:
in the case where the third request signal is sent to the communication device and an establishment of the second wireless connection has failed, display second notification information on the display unit, the second notification information being for execution of an operation for setting the communication device to operate in the second state.

6. The terminal device as in claim 1, wherein
in a case where a third wireless connection has been established between the terminal device and the access point and the third wireless connection is a first-type wireless connection being a connection in conformity with a Device Provisioning Protocol (DPP) scheme of the Wi-Fi standard, the first connection information includes a Signed-Connector in conformity with the DPP scheme, and
in a case where the third wireless connection has been established between the terminal device and the access point and the third wireless connection is a second-type wireless connection being a connection in which a Service Set Identifier (SSID) of a wireless network and a password of the wireless network are used, the first connection information includes the SSID and the password.

7. The terminal device as in claim 1, wherein
the first request signal is a Device Provisioning Protocol (DPP) Authentication Request in conformity with a DPP scheme of the Wi-Fi standard.

8. The terminal device as in claim 1, wherein
the second communication scheme is a Wi-Fi Direct scheme of the Wi-Fi standard, and
the second request signal is a G/O Negotiation Request in conformity with the Wi-Fi Direct scheme.

9. The terminal device as in claim 1, wherein
the public key is obtained by capturing a QR Code in which the public key is coded.

10. A terminal device comprising:
a wireless interface configured to execute a wireless communication in conformity with either of a first communication scheme of Wi-Fi standard and a second communication scheme of the Wi-Fi standard, the first communication scheme being for executing a wireless communication with a communication device via an access point, and the second communication scheme being for executing a wireless communication with the communication device not via the access point;
a controller configured to:
obtain a public key of the communication device;
send a second request signal to the communication device via the wireless interface;
in response to the second request signal being sent to the communication device, execute a second-type communication in conformity with the second communication scheme with the communication device via the wireless interface, the second-type communication including communicating second connection information with the communication device, and the second connection information being for establishing a second wireless connection between the terminal device and the communication device;
in a case where an establishment of the second wireless connection has failed;
send a first request signal being different from the second request signal to the communication device via the wireless interface, the first request signal being a signal in which the public key is used; and
in response to the first request signal being sent to the communication device, execute a first-type communication in conformity with the first communication scheme with the communication device via the wireless interface, the first-type communication including sending first connection information to the communication device, and the first connection information being for establishing a first wireless connection between the communication device and the access point.

11. The terminal device as in claim 10, wherein
in a case where the establishment of the second wireless connection has failed and a third wireless connection has been established between the terminal device and the access point, the controller sends the first request signal to the communication device, and
in a case where the establishment of the second wireless connection has failed and the third wireless connection has not been established between the terminal device and the access point, the first request signal is not sent to the communication device.

12. The terminal device as in claim 11, further comprising a display unit,
wherein the controller is further configured to:
in the case where the establishment of the second wireless connection has been failed and the third wireless connection has not been established between the terminal device and the access point, display first notification information on the display unit, the first notification information being for execution of an operation for establishing a wireless connection between the terminal device and the access point.

13. The terminal device as in claim 11, wherein
in a case where the communication device accepts an operation for establishing a wireless connection between the communication device and another device, the communication device operates either in a first state corresponding to the first communication scheme or in a second state corresponding to the second communication scheme,
the terminal device further comprises a display unit, and
the controller is further configured to:
in the case where the establishment of the second wireless connection has failed and the third wireless connection has not been established between the terminal device and the access point, display second notification information on the display unit, the second notification information being for execution of an operation for setting the communication device to operate in the second state.

14. The terminal device as in claim 10, wherein
in a case where a third wireless connection has been established between the terminal device and the access point and the third wireless connection is a first-type wireless connection being a connection in conformity with a Device Provisioning Protocol (DPP) scheme of the Wi-Fi standard, the first connection information includes a Signed-Connector in conformity with the DPP scheme, and in a case where the third wireless connection has been established between the terminal device and the access point and the third wireless connection is a second-type wireless connection being a connection in which a Service Set Identifier (SSID) of a wireless network and a password of the wireless network are used, the first connection information includes the SSID and the password.

15. The terminal device as in claim 10, wherein
the first request signal is a Device Provisioning Protocol (DPP) Authentication Request in conformity with a DPP scheme of the Wi-Fi standard.

16. The terminal device as in claim 10, wherein
the second communication scheme is a Wi-Fi Direct scheme of the Wi-Fi standard, and
the second request signal is a G/O Negotiation Request in conformity with the Wi-Fi Direct scheme.

17. The terminal device as in claim 10, wherein
the public key is obtained by capturing a QR Code in which the public key is coded.

18. A non-transitory computer-readable recording medium storing computer readable instructions for a terminal device:
the terminal device comprising:
a wireless interface configured to execute a wireless communication in conformity with either of a first communication scheme of Wi-Fi standard and a second communication scheme of the Wi-Fi standard, the first communication scheme being for executing a wireless communication with a communication device via an access point, and the second communication scheme being for executing a wireless communication with the communication device not via the access point; and
a processor,
wherein the computer-readable instructions, when executed by the processor, cause the terminal device to:
obtain a public key of the communication device;
send a first request signal in which the public key is used to the communication device via the wireless interface;
in response to the first request signal being sent to the communication device, execute a first-type communication in conformity with the first communication scheme with the communication device via the wireless interface, the first-type communication including sending first connection information to the communication device, and the first connection information being for establishing a first wireless connection between the communication device and the access point; and
in a case where an establishment of the first wireless connection has been failed:
send a second request signal different from the first request signal to the communication device via the wireless interface;
in response to the second request signal being sent to the communication device, execute a second-type communication in conformity with the second communication scheme with the communication device via the wireless interface, the second-type communication including communicating second connection information with the communication device, and the second connection information being for establishing a second wireless connection between the terminal device and the communication device; and
after the second-type communication is executed with the communication device, establish the second wireless connection between the terminal device and the communication device via the wireless interface by using the second connection information.

19. A non-transitory computer-readable recording medium storing computer readable instructions for a terminal device,
the terminal device comprising:
a wireless interface configured to execute a wireless communication in conformity with either of a first communication scheme of Wi-Fi standard and a second communication scheme of the Wi-Fi standard, the first communication scheme being for executing a wireless communication with a communication device via an access point, and the second communication scheme being for executing a wireless communication with the communication device not via the access point; and
a processor,
wherein the computer-readable instructions, when executed by the processor, cause the terminal device to:
obtain a public key of the communication device;
send a second request signal to the communication device via the wireless interface;
in response to the second request signal being sent to the communication device, execute a second-type communication in conformity with the second communication scheme with the communication device via the wireless interface, the second-type communication including communicating second connection information with the communication device, and the second connection information being for establishing a second wireless connection between the terminal device and the communication device;
in a case where an establishment of the second wireless connection has failed;
send a first request signal being different from the second request signal to the communication device via the wireless interface, and the first request signal being a signal in which the public key is used; and
in response to the first request signal being sent to the communication device, execute a first-type communication in conformity with the first communication scheme with the communication device via the wireless interface, the first-type communication including sending first connection information to the communication device, and the first connection information being for establishing a first wireless connection between the communication device and the access point.

* * * * *